US006973200B1

(12) United States Patent
Tanaka et al.

(10) Patent No.: US 6,973,200 B1
(45) Date of Patent: Dec. 6, 2005

(54) IMAGE PROCESSING APPARATUS, IMAGE PROCESSING METHOD, AND STORAGE MEDIUM

(75) Inventors: Koichiro Tanaka, Yokohama (JP); Hiroki Yonezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

(21) Appl. No.: 09/626,815

(22) Filed: Jul. 27, 2000

Related U.S. Application Data

(63) Continuation-in-part of application No. 08/839,828, filed on Apr. 22, 1997, now Pat. No. 6,542,191.

(30) Foreign Application Priority Data

Jul. 29, 1999 (JP) ................................. 11-215407
Jun. 27, 2000 (JP) ............................. 2000-192778

(51) Int. Cl.[7] .......................... G06K 9/00; H04N 5/225
(52) U.S. Cl. ..................................... 382/103; 348/169
(58) Field of Search ....................... 382/103, 113, 276, 382/189, 291, 312; 345/756, 805; 348/159, 348/169, 211.3, 211.9, 240.99, 333.01, 333.02, 348/208.14

(56) References Cited

U.S. PATENT DOCUMENTS

| | | | | |
|---|---|---|---|---|
| 4,992,866 A | * | 2/1991 | Morgan | 348/159 |
| 5,479,206 A | * | 12/1995 | Ueno et al. | 348/211.5 |
| 5,793,367 A | * | 8/1998 | Taguchi | 345/756 |
| 5,933,143 A | * | 8/1999 | Kobayashi | 345/805 |
| 6,208,379 B1 | * | 3/2001 | Oya et al. | 348/211.11 |
| 6,266,082 B1 | * | 7/2001 | Yonezawa et al. | 348/159 |
| 6,542,191 B1 | * | 4/2003 | Yonezawa | 348/333.01 |
| 6,680,746 B2 | * | 1/2004 | Kawai et al. | 348/211.9 |

* cited by examiner

Primary Examiner—Kanjibhai Patel
(74) Attorney, Agent, or Firm—Morgan & Finnegan, LLP

(57) ABSTRACT

Information such as a camera layout for representation on a map could not be entered while an image of a camera is confirmed on a display. In order to solve this problem, the present invention provides generating means for generating a map having a symbol indicating an installed position of a camera, receiving means for receiving image data corresponding to an image photographed by the camera associated, when information regarding the camera including the position of camera is associated with the map, and output means for outputting the received image data onto the display.

23 Claims, 36 Drawing Sheets

FIG. 5
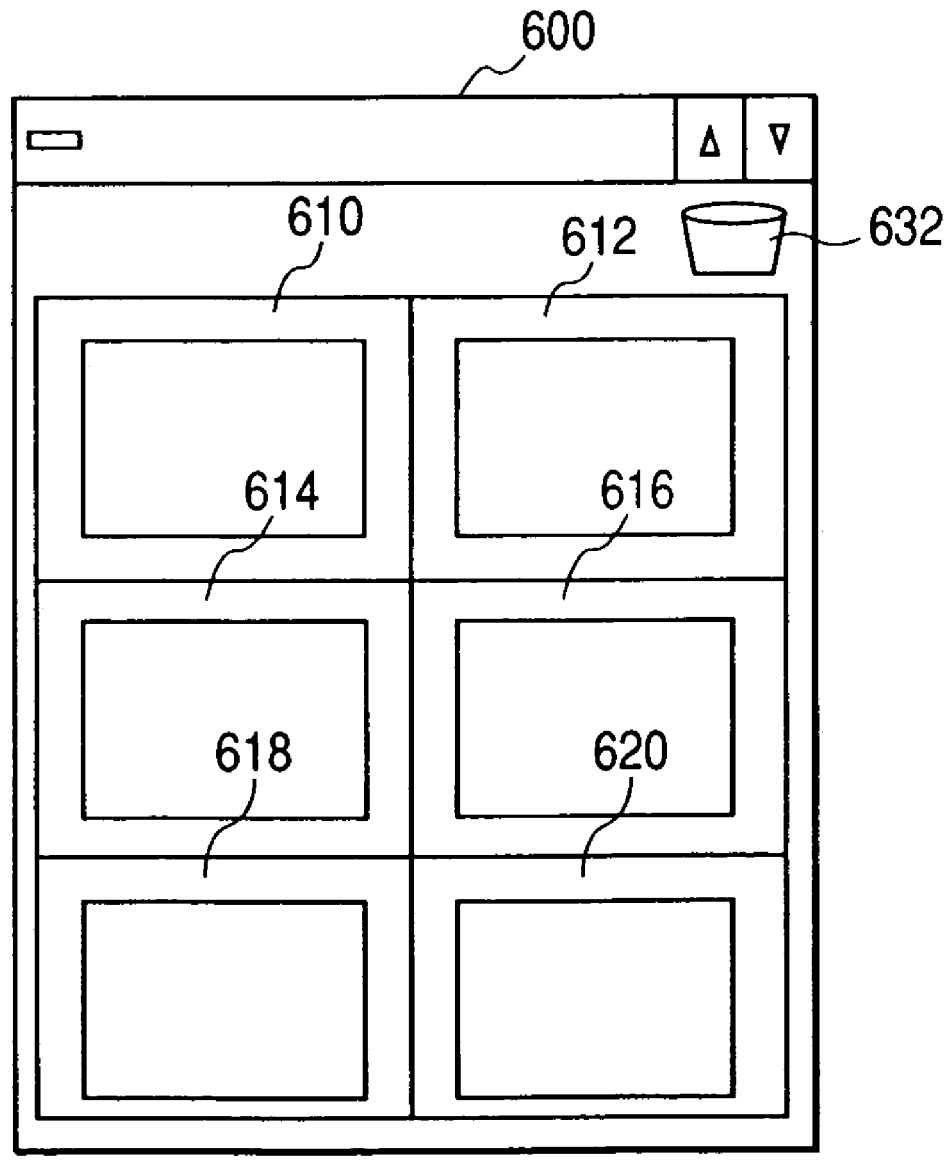
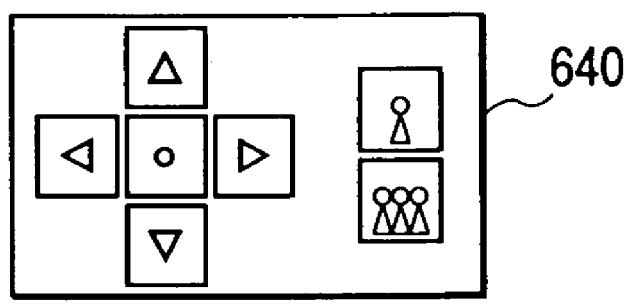

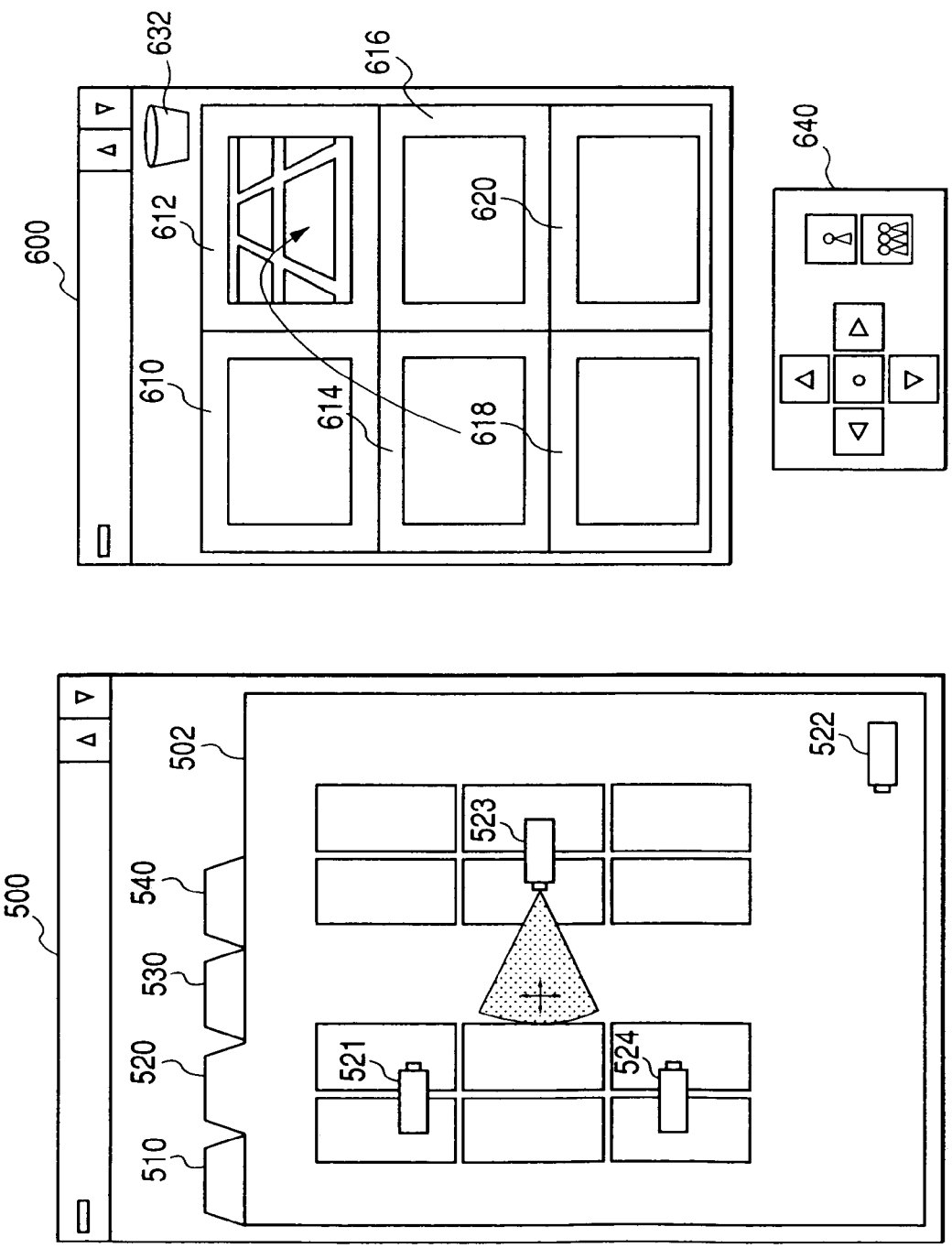

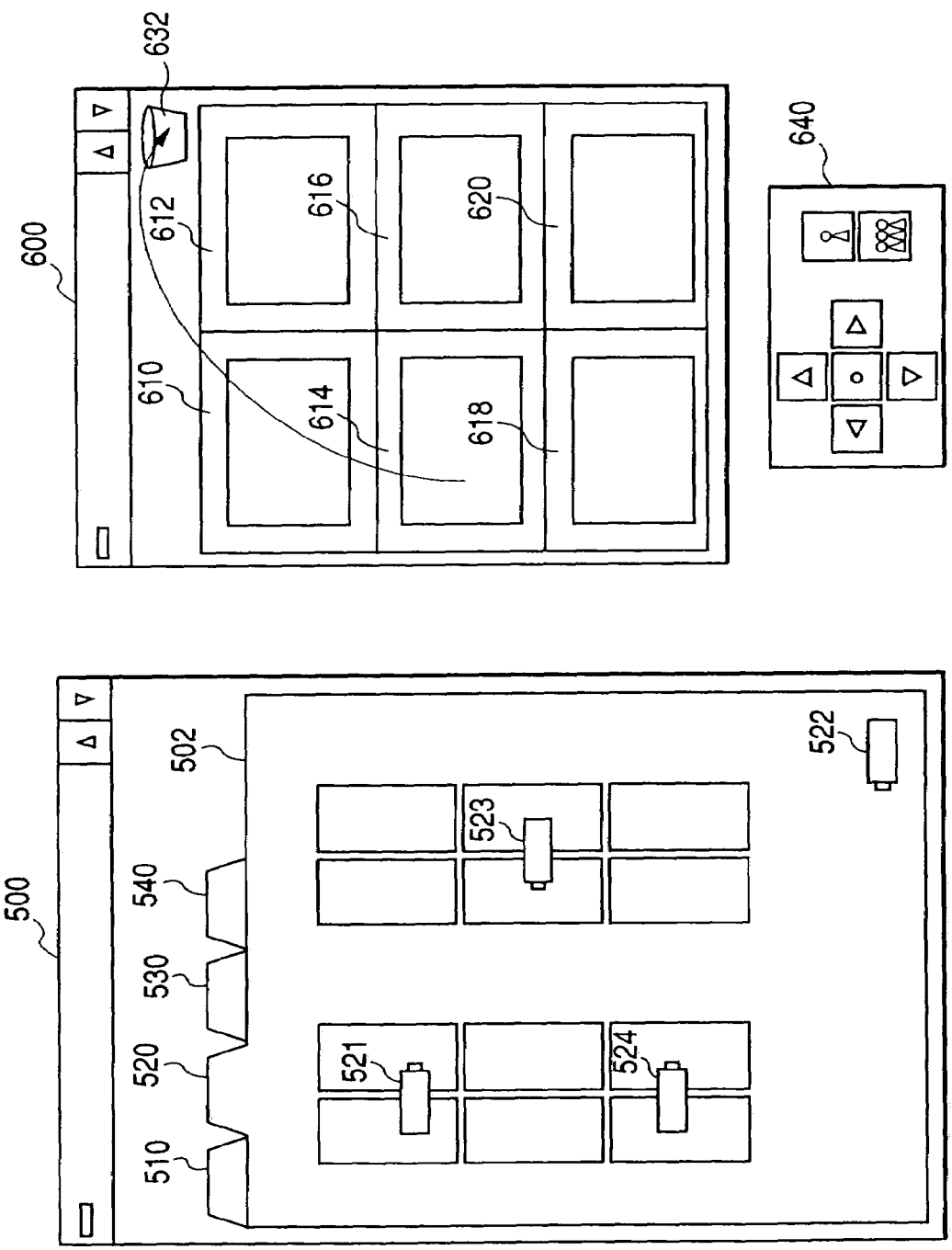

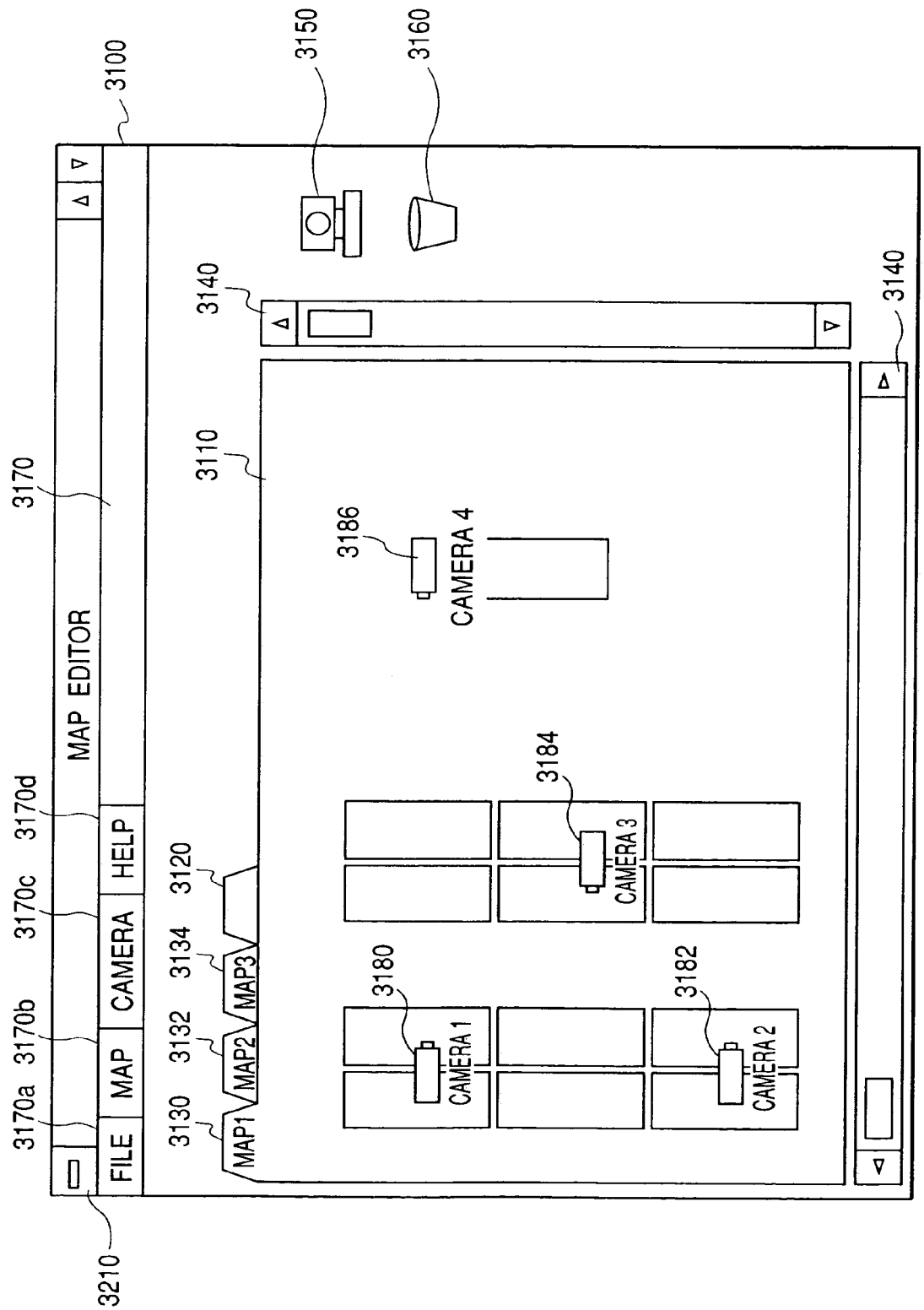

IMAGE PROCESSING APPARATUS, IMAGE PROCESSING METHOD, AND STORAGE MEDIUM

This application is a continuation-in-part of prior application Ser. No. 08/839,828, filed Apr. 22, 1997, now U.S. Pat. No. 6,542,191.

BACKGROUND OF THE INVENTION

1. Field of the Invention

The present invention relates to an image processing apparatus, an image processing method, and a storage medium.

2. Related Background Art

Monitoring equipment which is an example of utilizing an image display device and a camera control device is configured by several video cameras, a synthesizer for synthesizing analog signals of images, and a switcher which allows selection of the image (video camera). These are mainly used within relatively small-scale buildings, and generally referred to as a local monitoring system. In contrast to the local monitoring system, a remote monitoring system has appeared in the market, in which a digital network such as LAN or ISDN is used, rather than an analog cable in the image transmission path, to enable significant extension of the transmission line.

Recently, some monitoring systems have been publicized which use a personal computer (PC) for a monitoring terminal to enable image display and system control through the graphical user interface (GUI). Owing to the use of the GUI with the computer in the monitoring equipment, there is an advantage that even the person unfamiliar with the monitoring equipment can easily perform the operation.

However, conventional systems of this kind had much room for improvement left in that the arrangement of cameras is represented on the map to provide the higher operability.

Also, there was some room for improvement in simply and securely setting the network connection of camera.

SUMMARY OF THE INVENTION

It is an object of the present invention to provide an apparatus which allows confirmation of whether the network connection of camera has been correctly set in such a way as to switch connection to a camera to confirm an image with a simple operation.

It is another object of the invention to provide an image processing apparatus and an image processing method which can provide new functions.

Other features of the present invention will be more apparent from the following description of the embodiments and the drawings.

BRIEF DESCRIPTION OF THE DRAWINGS

FIG. 5 is an example of an image display window 600 in this embodiment;

FIG. 8 is a view showing how the display area is changed with the D & D operation;

FIG. 10 is a view showing how the display of image is stopped with the D & D operation;

FIG. 11 is a view illustrating the display of a map editor in this embodiment;

FIGS. 19A, 19B and 19C are diagrams illustrating the display of a main pull-down menu in the map editor, wherein FIG. 19A is a file menu, FIG. 19B is a map menu, and FIG. 19C is a camera menu;

DETAILED DESCRIPTION OF THE PREFERRED EMBODIMENTS

Embodiments of the present invention will be described below in detail with reference to the drawings.

Figure 1:
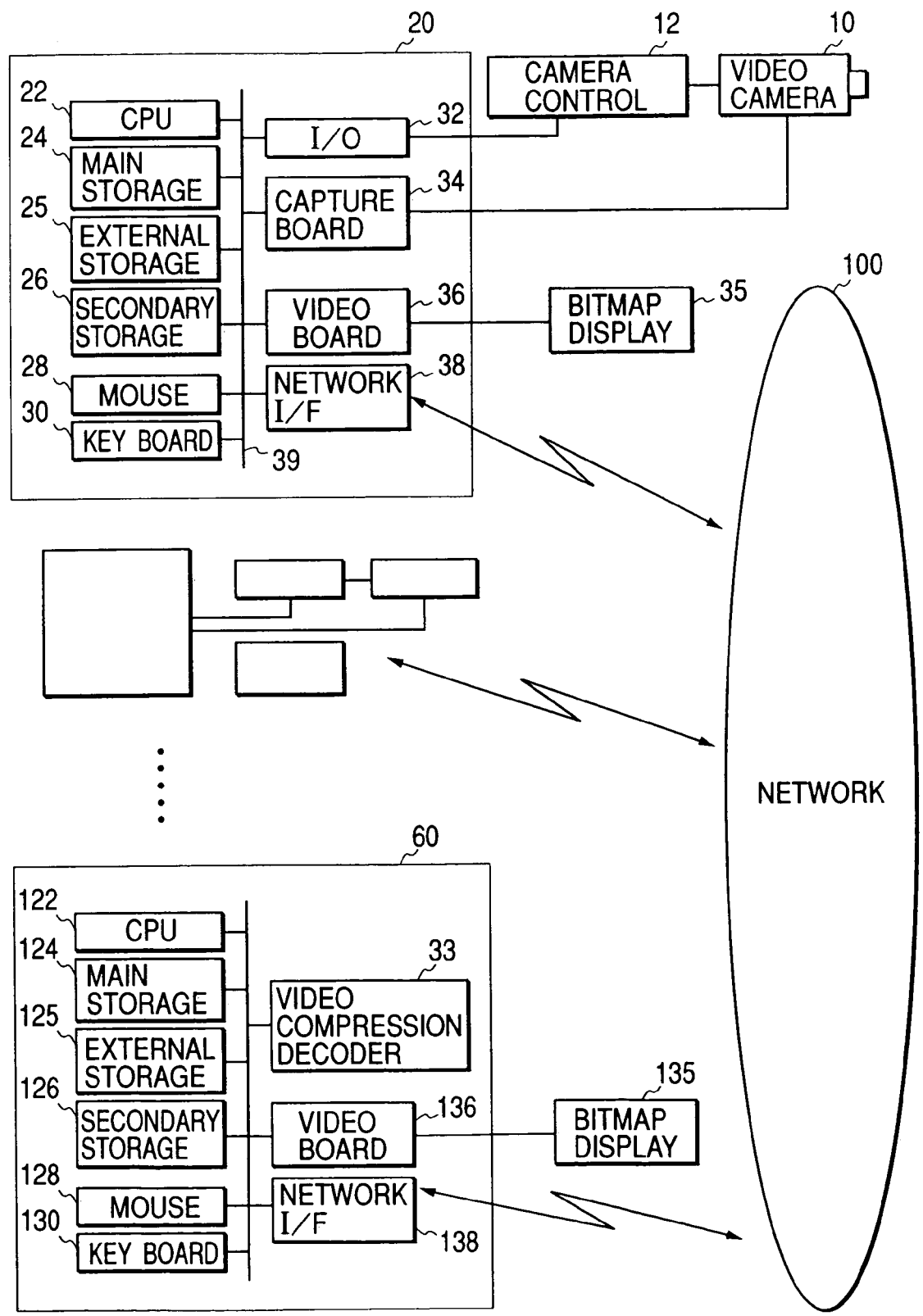
FIG. 1 is a block diagram showing an image transmission terminal and a monitor terminal according to an embodiment of the present invention.

FIG. 1 is a block diagram showing a schematic configuration of an overall system containing an image transmission terminal and a monitor terminal. In this embodiment, equipment on the image transmission side comprises a video camera 10 as one example of an image signal generating unit, a camera control circuit 12 for controlling the video camera 10, an image transmission terminal 20, and a bit map display 35.

The camera control circuit 12 directly controls a pan, a tilt, a zoom, a focus adjustment, and a diaphragm of the video camera 10 (hereinafter simply referred to as a camera) in accordance with an external control signal from the image transmission terminal 20. The external control signal is input via RS-232C, USB, or an interface in accordance with IEEE1394, for example. When the camera 10 can not control the pan or tilt, the camera control circuit 12 is not exactly needed. Also, the cameral control circuit 12 may control the power on or off of the camera 10.

The image transmission terminal 20 is a computer which controls the camera 10 connected to the camera control circuit 12 by sending a control code to the cameral control circuit 12, and transmits the image data acquired from the camera 10 via a network interface 38 to a network. This computer may be a workstation (WS) or a personal computer (PC), for example.

The configuration of the image transmission terminal 20 in this embodiment will be described below.

The image transmission terminal 20 comprises a CPU 22 for controlling the whole equipment, a main storage unit 24, an external storage unit 25 for mounting removably a floppy disk or CD-ROM, a secondary storage unit 26 such as a hard disk, a mouse 28 as the pointing device, a keyboard 30, an I/O board 32, a video capture board 34, a video board 36, a network interface 38, and a system bus 39 for interconnection of the devices from the CPU 20 to the network interface 38.

In this configuration, the pointing device is not limited to the mouse, but may be other devices, for example, a touch panel on the display 35.

A software of this system may be read from a medium of the external storage unit 25 or via the network interface 38 and stored in the secondary storage unit 26.

The I/O board 32 is connected to the camera control circuit 12 to send and receive a camera control signal. Herein, the camera control circuit 12 may be contained within the image transmission terminal 20. The video capture board 34 accepts a vide output signal VD of the camera 10. Herein, the video output signal VD may be an analog signal such as NTSC or a digital signal. In the analog signal, an A/D conversion function may be required. The video capture board 34 has no need of comprising a data compression function, but if the compression function is not provided, the compression is desirably performed by software. The captured image is transmitted in the form of compressed data via the network interface 38 and through the network to the monitor terminal 60. Also, it is passed from the capture board 34 via the system bus 39 to the video board 36 and displayed at any position on the bit map display 35. The control of such display position is performed by the CPU 22 instructing the display position or area to the video board 36.

With the above configuration, the image transmission terminal 20 transmits the image through the network 100 to the monitor terminal 60 at the remote site and receives a camera control signal from the monitor terminal to control the camera.

The monitor terminal (image reception terminal) 60 which is schematically shown in FIG. 1 will be described below.

The monitor terminal 60 issues a control signal for the camera 10 to the image transmission terminal 20. The image transmission terminal 20 controls the video camera in accordance with such control signal, and returns a resulted status of the camera 10 via a network 100 to the monitor terminal 60. The monitor terminal 60 displays the status of the camera 10 on a display unit, e.g., a bit map display 135. Also, the monitor terminal 60 receives the image data transmitted from the image transmission terminal 20, to allow the compressed and encoded data to be expanded by software and displayed on the display unit in real time. This monitor terminal 60 has the same configuration as the image transmission terminal 20 without the camera 10, the camera control unit 12, and the capture board 34, as seen from FIG. 1. The components having the same function are indicated by the same reference numerals with "100" added in FIG. 1. It is of course unnecessary to remodel the monitor terminal. If the CPU 22 has less power, and it takes much time to expand, an extended hardware having the decode and expansion functions may be mounted.

In this embodiment, the image transmission terminal 20 and the monitor terminal 60 are separately provided. However, it is practical that one terminal having both functions may be provided to be useful for the image transmission terminal and the monitor terminal.

With the above configuration, the image data can be received through the network 100 from the image transmission terminal 20 at remote site, and displayed at any position on the bit map display 135 or on the monitor display unit. A video camera control code corresponding to a control command of the camera 10 which is input by the operator from the keyboard 130 or the mouse 128 can be transmitted to the image transmission terminal 20.

Figure 2:
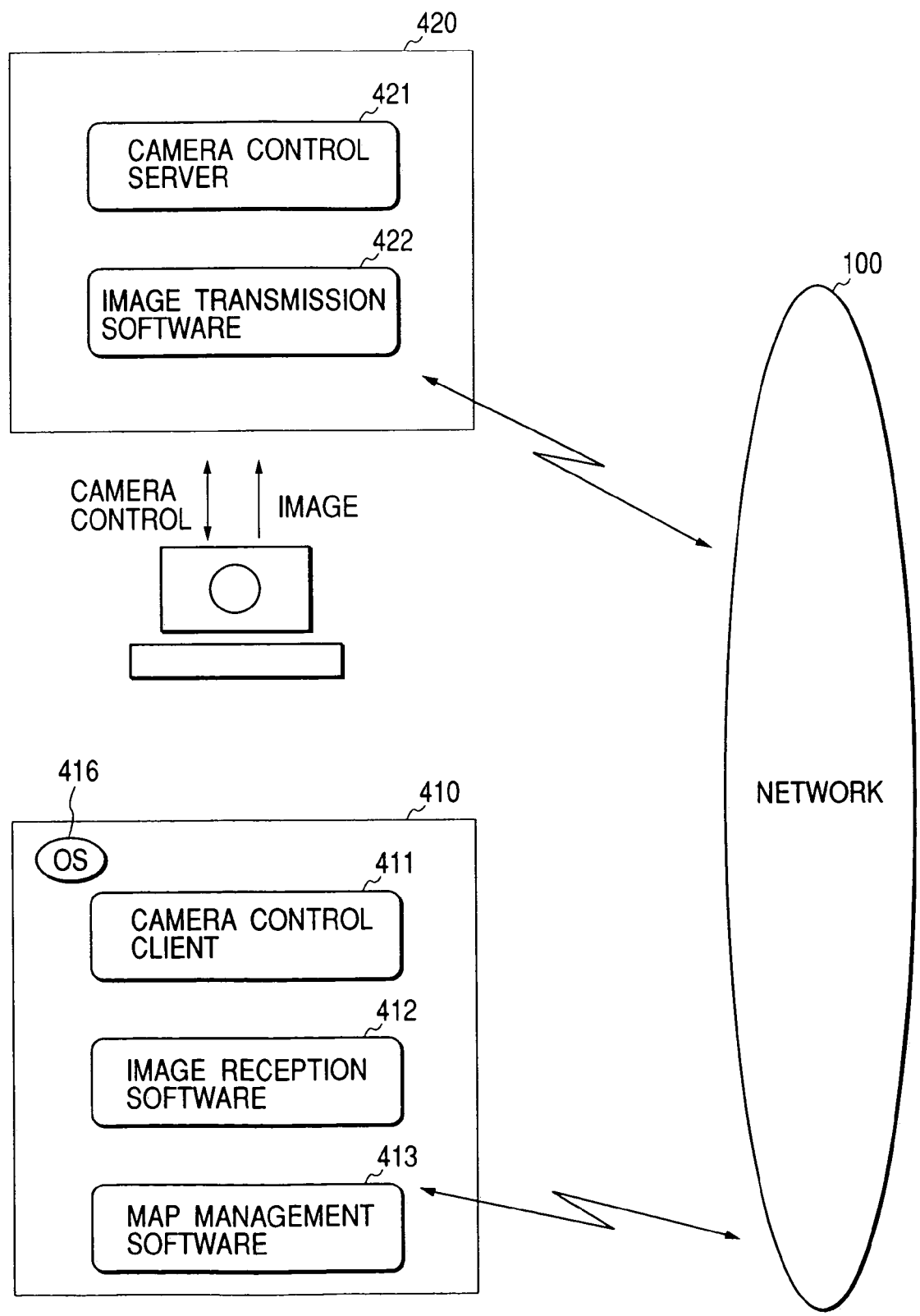
FIG. 2 is a block diagram of software according to the embodiment of the present invention.

FIG. 2 is a diagram showing a software configuration of this embodiment. The monitor terminal 60 has a software 410 installed, and the image transmission terminal 20 has a software 420 installed. Owing to the software 410, 420, the terminals 20, 60 can be operable with each other via the network 100.

Figure 6:
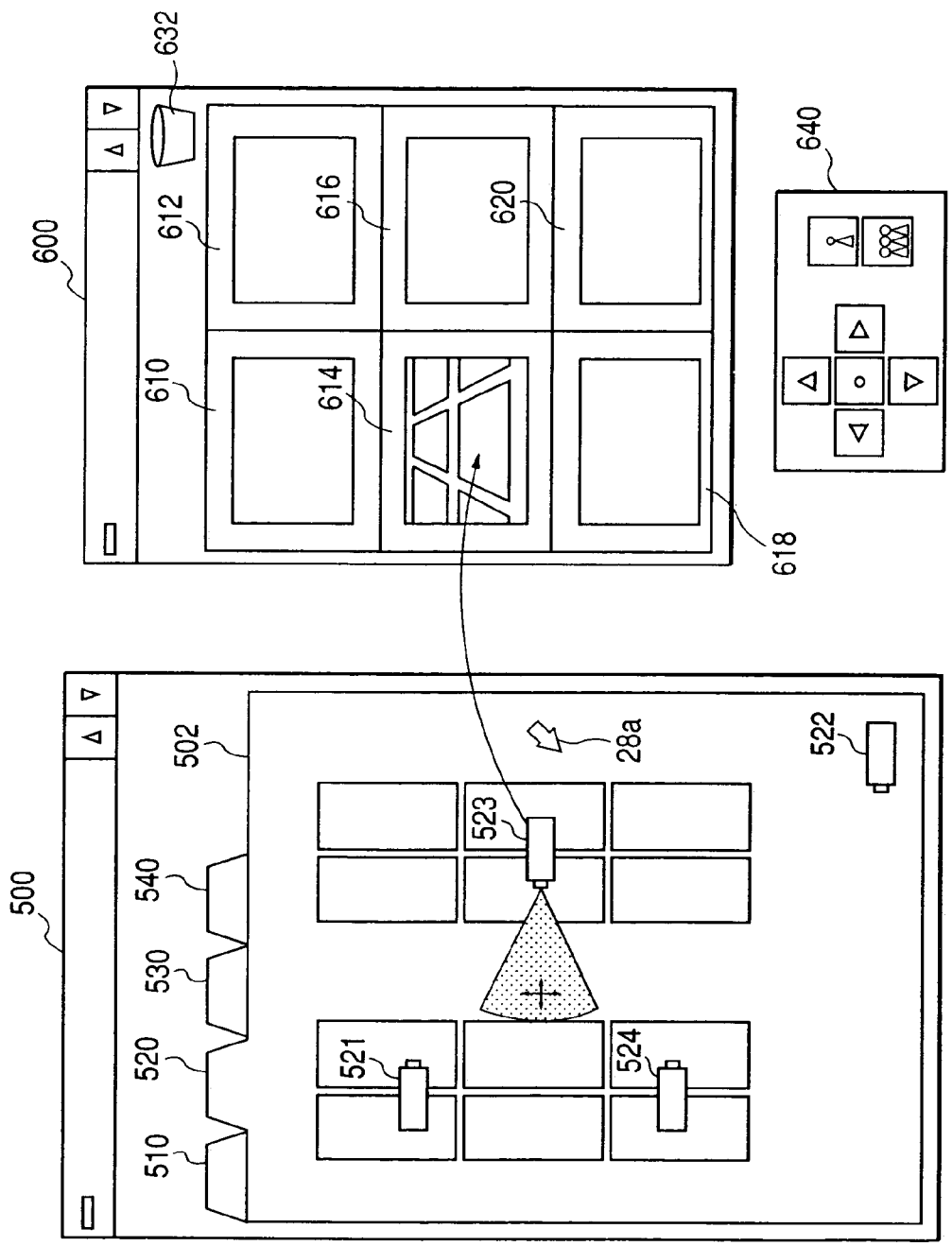
FIG. 6 is a view showing the display with the D & D operation.

The software 410 installed on the monitor terminal 60 comprises a camera control client 411 for remotely controlling the camera 10 which is connected to the image transmission terminal 20 on the network 100, an image reception software 412 for receiving the image data transmitted in the form of packets from the image transmission terminal 20 to decode, expand and display the image data, and a map management software 413 with GUI for graphically displaying the position, pan and zoom of the camera in a scope display with the map and camera symbols as shown in FIG. 6, and controlling the camera. This map management software 413 functions as map display means and symbol display means, but more specifically the CPU 22 performs the processing based on this software.

The image reception software 412 is a central software for managing the cameras 10 in all the image transmission terminals 20 connected to the network 100, comprising a camera name of each camera 10, a host name of the image transmission terminal (computer) 20 to which the camera 10 is connected, a camera status of pan/tilt and zoom, information as to whether the camera 10 is controllable or not, and information indicating the current state as to which camera is being controlled at present, and which image of camera is being displayed. Specifically, such information is stored in the main storage unit 124 which acts as secondary storage means. Such information is commonly utilized in the camera control client 411 and the map management software 413, for example, to change the display status of camera symbol.

The software 420 to be installed in the image transmission terminal 20 includes a camera control server 421 for controlling the status of the camera 10 such as pan/tilt, zoom, and white balance for the camera 10 connected to the image transmission terminal 20, and an image transmission software 422 for storing the image data output from the camera 10 while being in cooperation with the image reception software 412.

Figure 4:
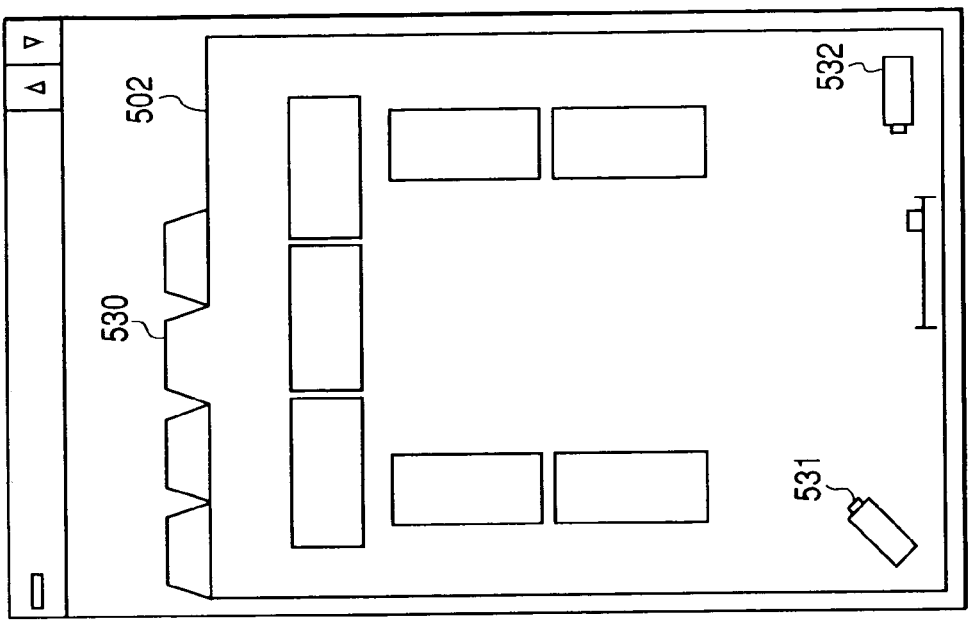
FIG. 4 is a view of a map 530, when the map is switched.
Figure 3:
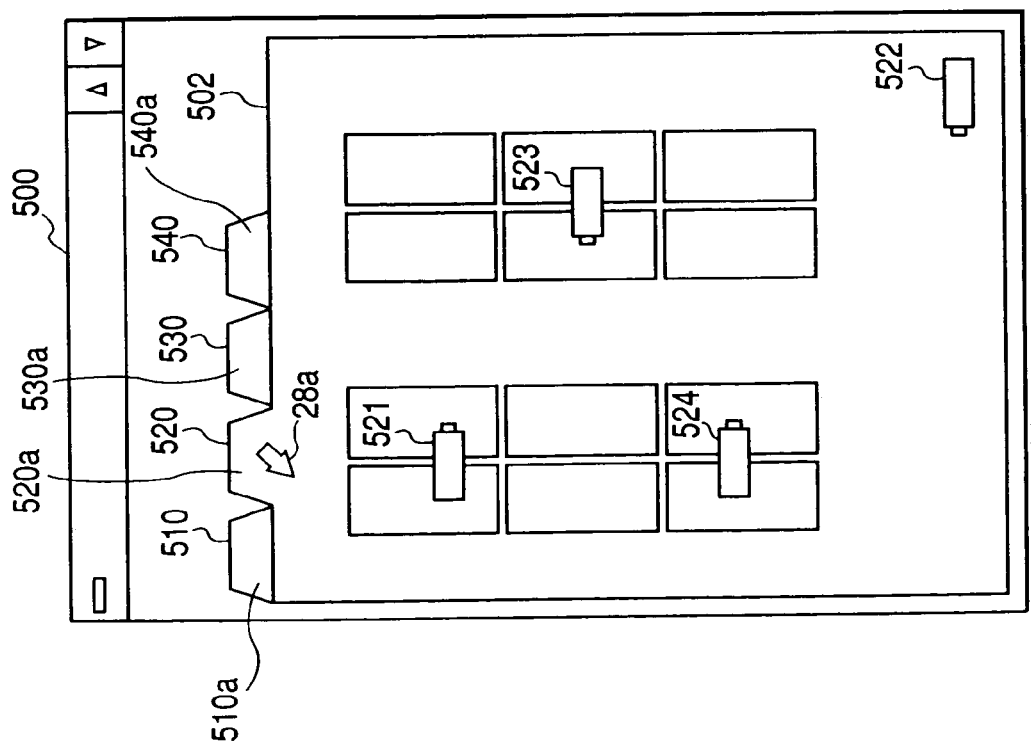
FIG. 3 is an example of screen in this embodiment.

FIG. 3 is an example of a screen displayed on the bit map display 135 for the monitor terminal 60. Reference numeral 500 denotes a map window for managing a plurality of maps 510, 520, 530, 540 representing the layout of office, store or storehouse in this embodiment. The number of maps depends on the system performance, and specifically is not limited. The maps 510, 520, 530, 540 are attached with the tags 510a, 520a, 530a, 540a, respectively. By positioning a cursor 28a at a tag 510a, 520a, 530a, 540a and clicking it with the mouse 28, a map with the clicked tag is displayed on a map display area 502. At the same time, a camera symbol arranged on the map is also displayed. In FIG. 3, of the maps 510 to 540, a map 520 is displayed in the map display area 502, with the camera icons 521, 522, 523, 524 arranged on the map 520. Herein, if a tag 530a of a map 530 is clicked, the map 530 is displayed in the map display area 502, with the camera icons 531, 532 arranged on the map 530 as shown in FIG. 4.

FIG. 5 is a view showing an image display window 600 for displaying an input image signal, in which an image signal received via the network 100 is displayed in each window.

In FIG. 5, the areas 610, 612, 614, 616, 618, 620 within the image display window 600 are image display areas, the number of which is six in this embodiment, but as a matter of course, is not limited thereto. The map window 500 of FIG. 3 and the image display window 600 of FIG. 5 may be displayed on the same screen, or the separate screens, namely the separate monitor units. In this embodiment, the image display window 600 is provided with a garbage collection icon 632 for deleting the camera image being displayed from the image display area. Also, a camera control panel 640 is disposed under the image display window 600. This camera control panel 640 comprises various kinds of camera control buttons to control the pan/tilt, and zoom of the selected camera. The panel 640 may be provided on the same screen as the window 500, 600 or on a separate screen.

Referring to FIGS. 6 to 10, the GUI of the monitor system in this embodiment will be described below.

Figure 7:
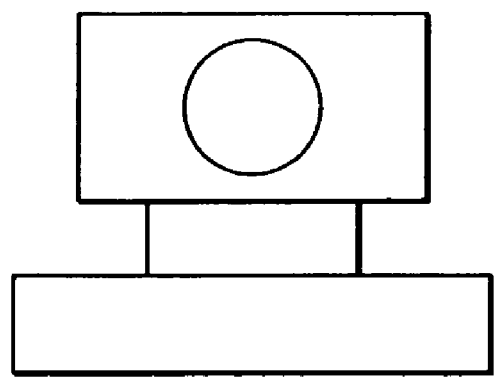
FIG. 7 is a view illustrating the shape of mouse cursor with the D & D operation.

In this embodiment, a camera icon on the maps 520, 530 . . . is dragged and dropped to any image display area (an area 614 in FIG. 6) within the image display window 600 (i.e., the cursor 28a is moved to a certain object and the cursor 28a is moved while the mouse 28 is being clicked (drag), and the click is released at a desired position (drop), hereinafter referred to D & D), so that a dynamic image from the camera corresponding to the icon with D & D is displayed in the image display area where the icon has been dropped. In FIG. 6, a camera icon 523 has been dragged and dropped to the image display area 614. During the dragging, the shape of the mouse cursor 28a becomes the shape of camera, as shown in FIG. 7, to allow the user to confirm that D & D is being operated. Then, the map management software 413 retrieves the ID number of the camera 10 from the positional information of the camera icon 523 dragged, and informs the ID number of the camera 10 moved with D & D to the image reception software 412. The image reception software 412 investigates, from this ID number, the pan/tilt of the camera 10, the camera name, and the host name of the image transmission terminal 20 to which the camera 10 is connected, and then passes the information to the camera control client 411 and the map management software 413.

The camera control client 411 makes a network connection to the camera control server 421 of the image transmission terminal 20 to which the camera 10 is connected, based on this information. Thereafter, the camera control is performed by both the camera control client 411 and the camera control server 421 so that the information such as the pan/tilt of the camera 10 is notified from the camera control client 411 to the image reception software 412 constantly.

Figure 9:
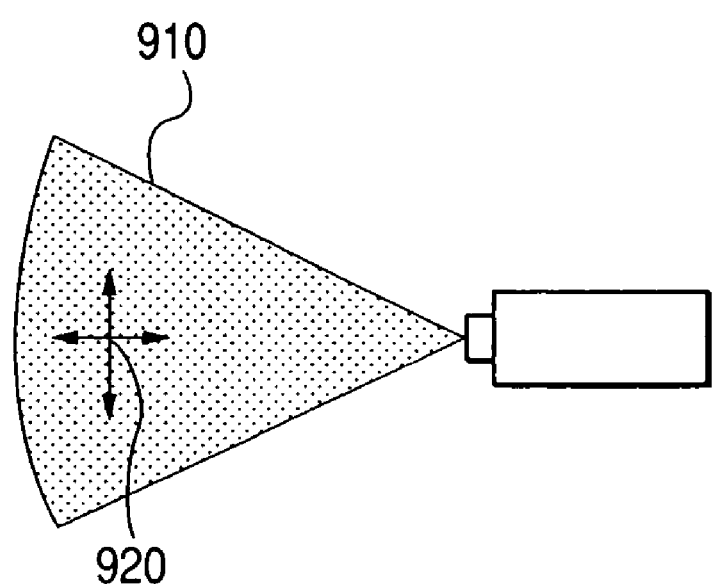
FIG. 9 is a view illustrating the display of a camera icon while the image is displayed.

The map management software 413 causes the relevant data to be sent to a VRAM (video RAM) not shown within a video board 136 to change the direction of camera icon to correspond to the actual direction of the camera 10, draw a scope 910 indicating the in-display, or draw a control pointer 920 to control the pan/tilt and zoom of the camera 10 in the scope 910, as shown in FIG. 9. To effect the above display, the map data stored in the main storage unit 24 is updated.

The map management software 413 is constantly notified with the information such as the pan/tilt of the camera 10 from the image reception software 412. If the status of the pan/tile or zoom of the camera is changed on the camera control panel 640, it is reflected immediately to the camera icons 521, 522, 523, . . . , 531, 532, 533, . . . The actual transmission of the image is performed upon a request from the image reception software 412. The image reception software 412 requests the image transmission software 422 of the image transmission terminal 20, to which the camera 10 is connected, to transmit one frame of data via the network 100. The image transmission software 422, on receiving this request, divides the data of the newest captured frame into packets and transmits them to the image reception software 412. The image reception software 412 reconstructs a frame from the packets, and displays the frame in the corresponding image display area to make an image transmission request again. By repeating this operation rapidly, a dynamic image of the video camera can be displayed on the bit map display 135. When a plurality of cameras 10 is involved in the image display, the process of issuing an image transmission request, compressing the captured image, packet disassembly, network transmission, packet reception, frame reconstruction, decode, expansion, and display is repeated sequentially to the image transmission software 422 stored on the image transmission terminal 20 to which each camera 10 is connected.

The movement of the display position of the video camera image can be made by dragging and dropping the displayed image to a desired image display area, as shown in FIG. 8. In FIG. 8, the image of a video camera 523 displayed in an image display area 614 has been moved to an image display area 612.

Then, the image reception software 412 clears the image displayed in the image display area 614 and changes the internal parameters to set the area 612 of D & D destination to the image display area of the video camera 10. Thereafter, the image is displayed in the area 612 of D & D destination. By this operation, no logical network connection is disconnected. That is, the network, once connected, is not cut off until the image display area is dragged and dropped to the garbage collection icon 632, as will be described later. When the display of video camera image is terminated, the image display area for displaying the image of video camera to terminate the display is dragged and dropped to the garbage collection icon 632 within the image display window 600, as shown in FIG. 10. Thereby, the display of the corresponding image can be terminated. In FIG. 10, the image of the camera 10 corresponding to the camera icon 523 displayed in the image display area 614 has been terminated. Then, the image reception software 412 clears the image displayed in the image display area 614 and terminates issuing an image transmission request to the corresponding image transmission software 422. Further, it notifies the camera control client 411 or the map management software 413 that the display has been terminated. The camera control client 411, when notified that the display has been terminated, cuts off the network connection to the camera control server 421. On the other hand, the map management software 413 removes the scope display from the camera icon 523 of the camera 10 and updates the map data stored in the main storage unit 24.

This system which operates in the above way makes use of a text file for setting, called a "map file", to manage the map name, the tag attached name, the bit map displayed in the background, the camera icon displayed in synthesis, and the direction of its platform.

A map file stores one or more "map data" and "camera data", and the description of the combinations of camera icon and background bit map which are displayed in synthesis.

This system allows the settings to be changed simply by referring to a map file.

Several technical terms are defined as follows before giving the specific explanation.

Herein, the "map data" generically means
(1) Name for each map (hereinafter referred to as a map name)
(2) Name attached to each map tag (hereinafter referred to a map tag name)
(3) Actual file name of background bit map to be displayed in the map window 502 (hereinafter referred to as a bit map name).

Also, the "camera data" generically means
(1) Name of image transmission terminal to which each camera is connected (hereinafter referred to as a host name)
(2) Position on the background bit map in absolute coordinates, at which the camera icon is synthesized (hereinafter referred to as a camera position)
(3) Direction of platform for the camera icon (hereinafter referred to as a camera direction)
(4) Name for camera (hereinafter referred to as a camera name)
(5) Parameter indicating whether or not the camera is remotely controllable (hereinafter referred to as a camera type)

A combination of the corresponding map data and camera data, or a composite screen of the camera icon and the background bit map which is generated by such data, is called a "map".

Since these elements are all described as the text data in the map file, they can be edited on a general text editor. In this case, however, one must perform repetitively a cycle of edit, display, and confirmation. To ameliorate the above inconvenience, the present invention proposes means "map editor" to enable the user to edit with WYSIWYG (What you see is what you get) easily and in short time.

This map editor will be described below.

FIG. 11 shows a GUI of the map editor. Reference numeral 3100 denotes a map editor window, and reference numeral 3110 denotes a map representation window. A background bit map for a map corresponding to a map tag 3130, 3132, 3134 clicked immediately before is displayed. FIG. 11 shows the GUI of the map editor after a tag 3130 having a map tag name of MAP1 has been clicked. This map having the map tag name of MAP1 has the camera data indicated by the camera icons 3180, 3182, 3184, and 3186. Under the camera icons 3180, 3182, 3184, 3186, the camera names "CAMERA 1", "CAMERA 2", "CAMERA 3", and "CAMERA 4" are displayed, respectively. On the map tags 3130, 3132, 3134 of the map, the map tag names "MAP 1", "MAP 2" and "MAP 3" are displayed, respectively.

Figure 12:
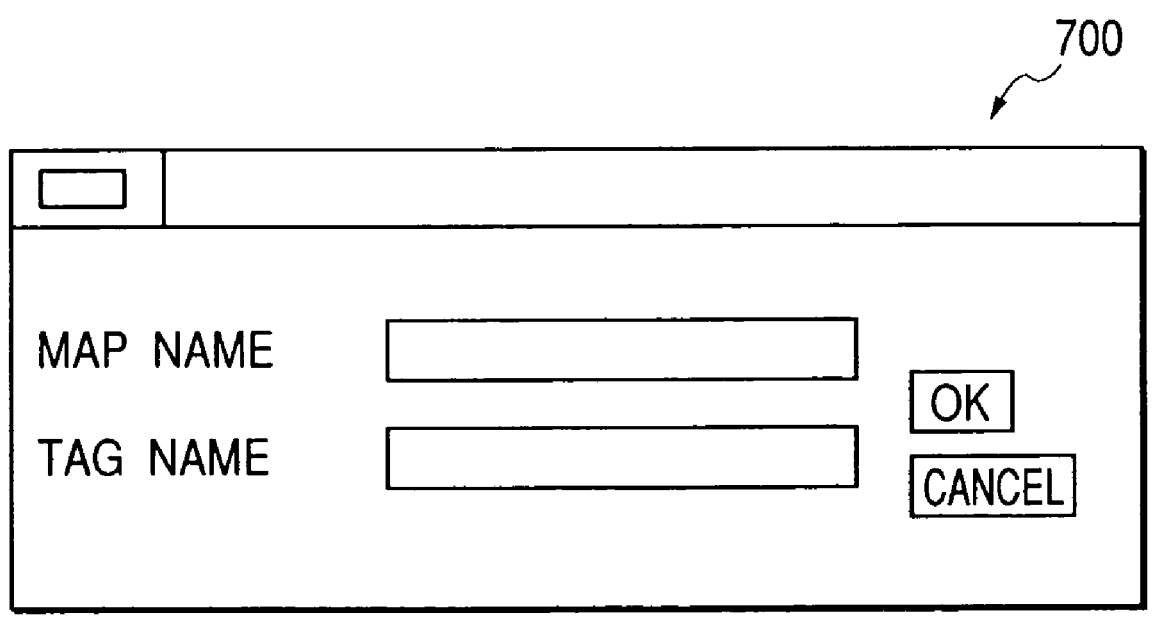
FIG. 12 is a view illustrating the display of a map name dialog in this embodiment.
Figure 13:
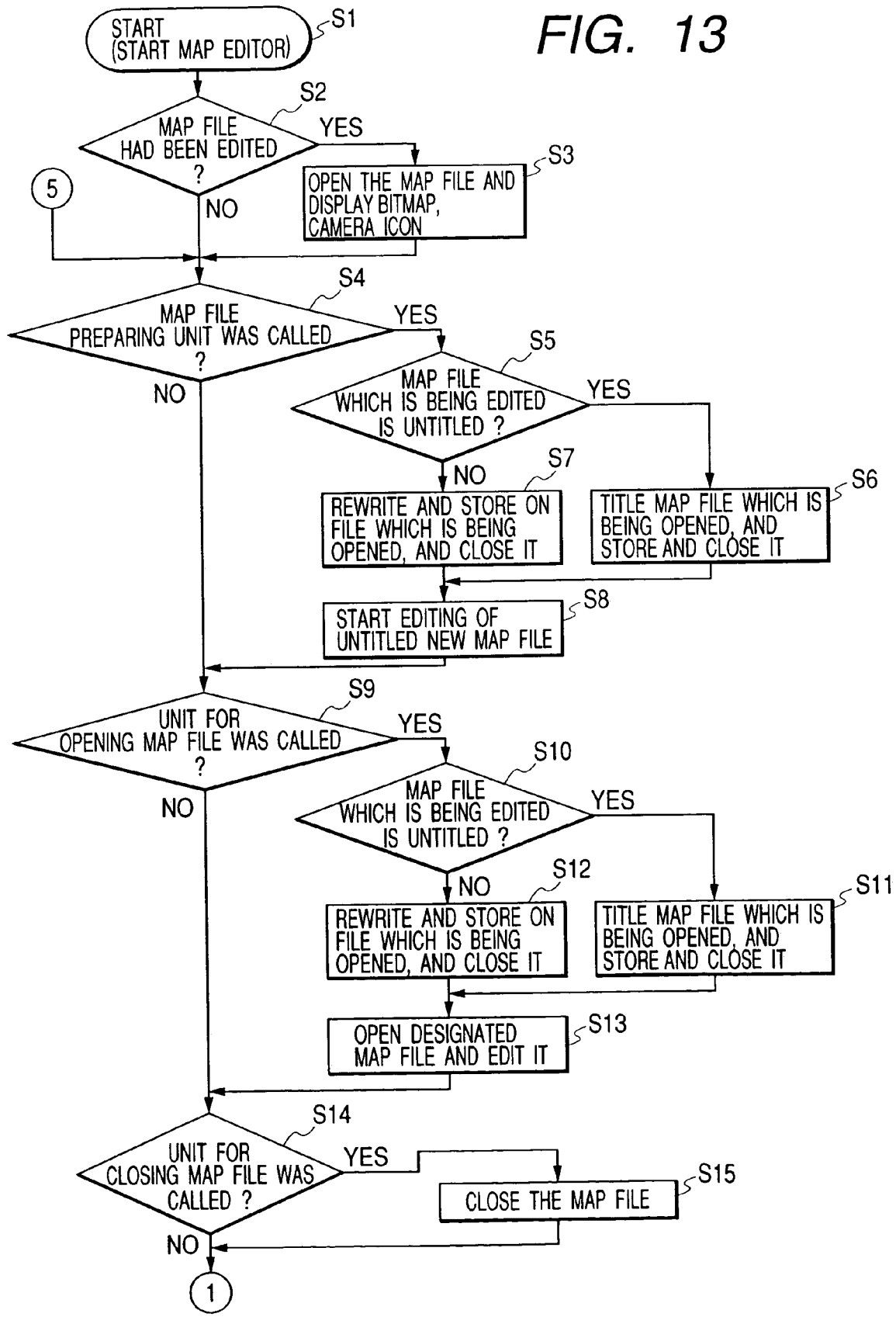
FIG. 13 is a flowchart showing the processing flow of the map editor in this embodiment, along with FIGS. 14 to 17.
Figure 14:
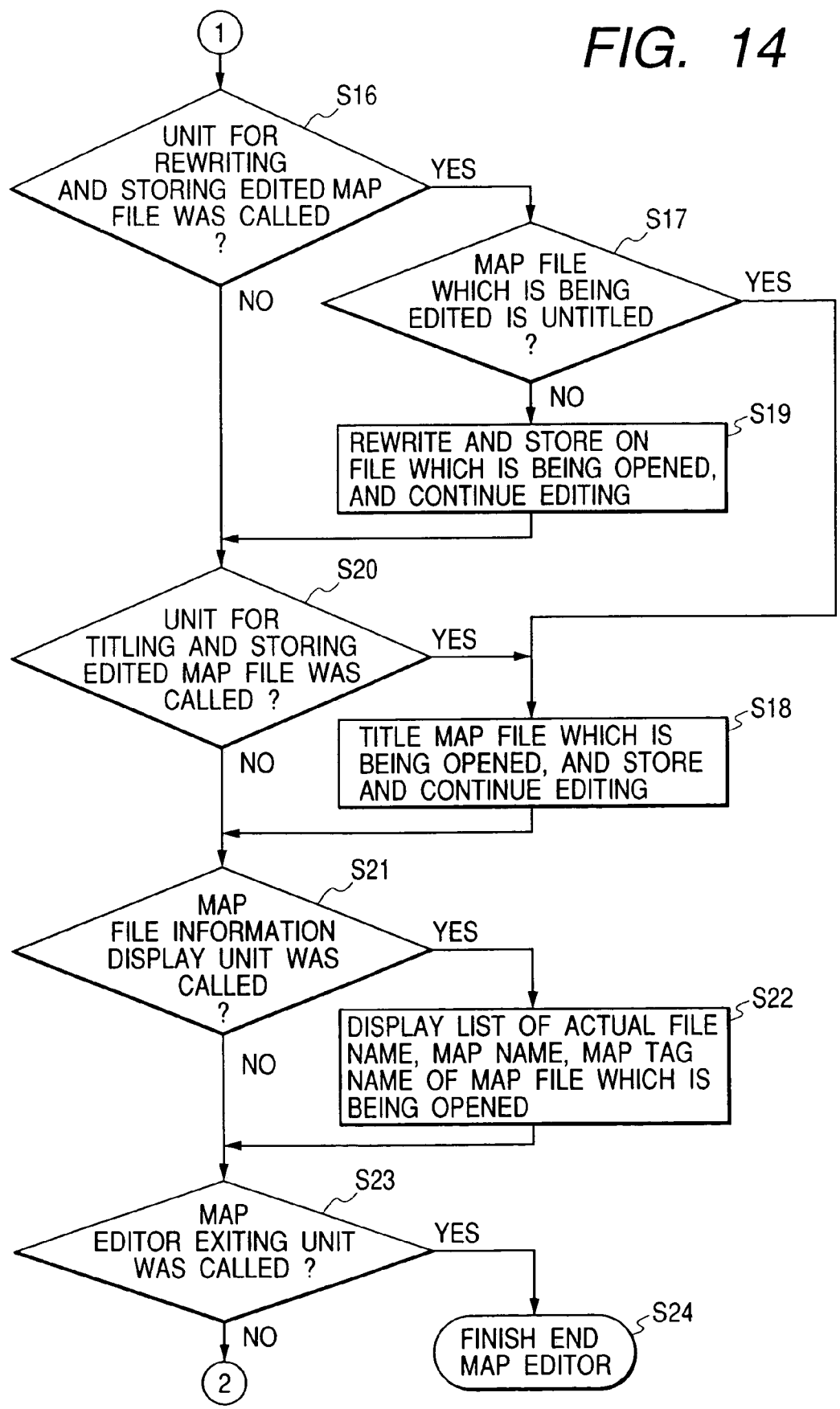
FIG. 14 is a flowchart showing the processing flow of the map editor in this embodiment, along with FIGS. 13 and 15 to 17.
Figure 15:
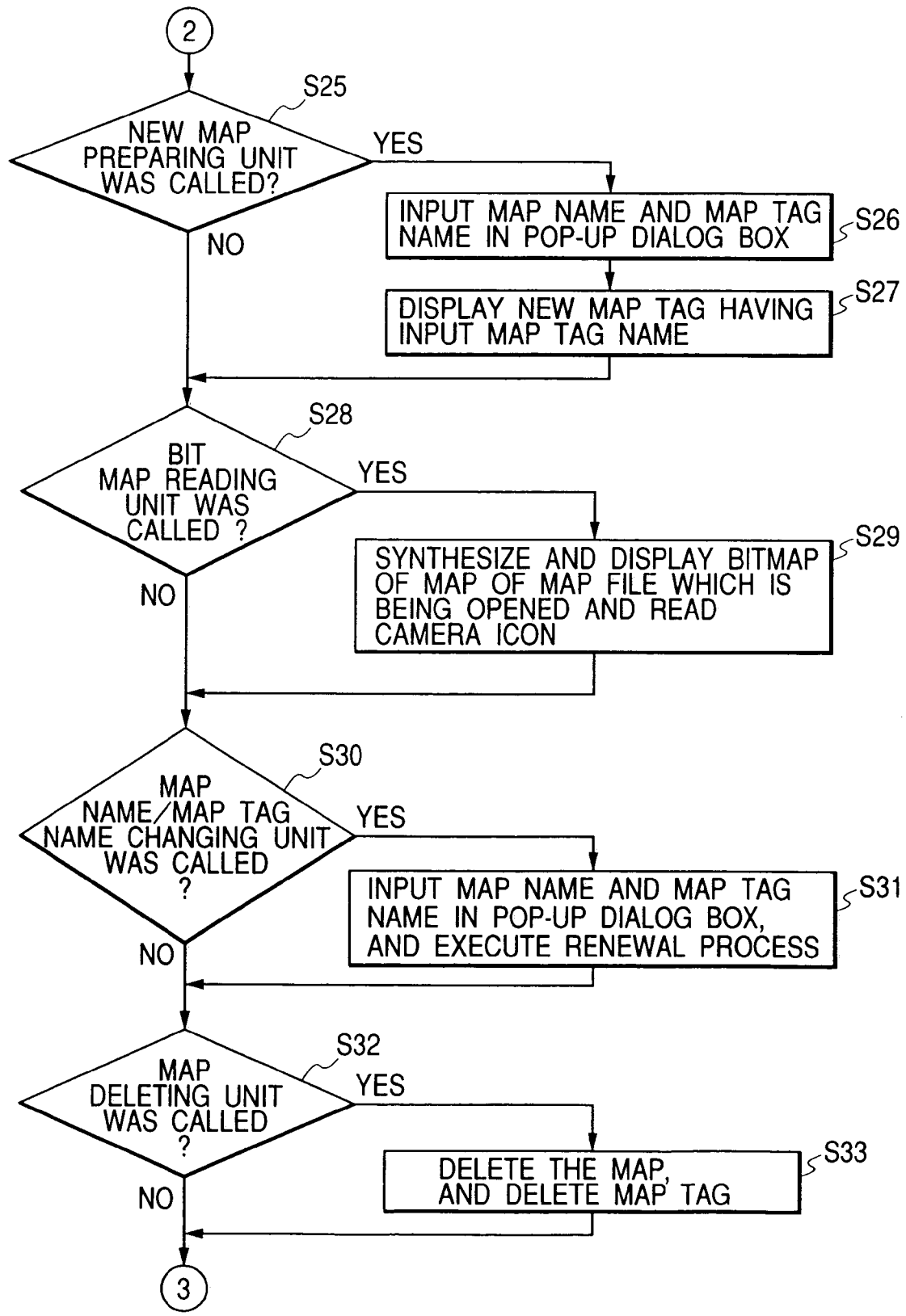
FIG. 15 is a flowchart showing the processing flow of the map editor in this embodiment, along with FIGS. 13, 14, 16 and 17.
Figure 16:
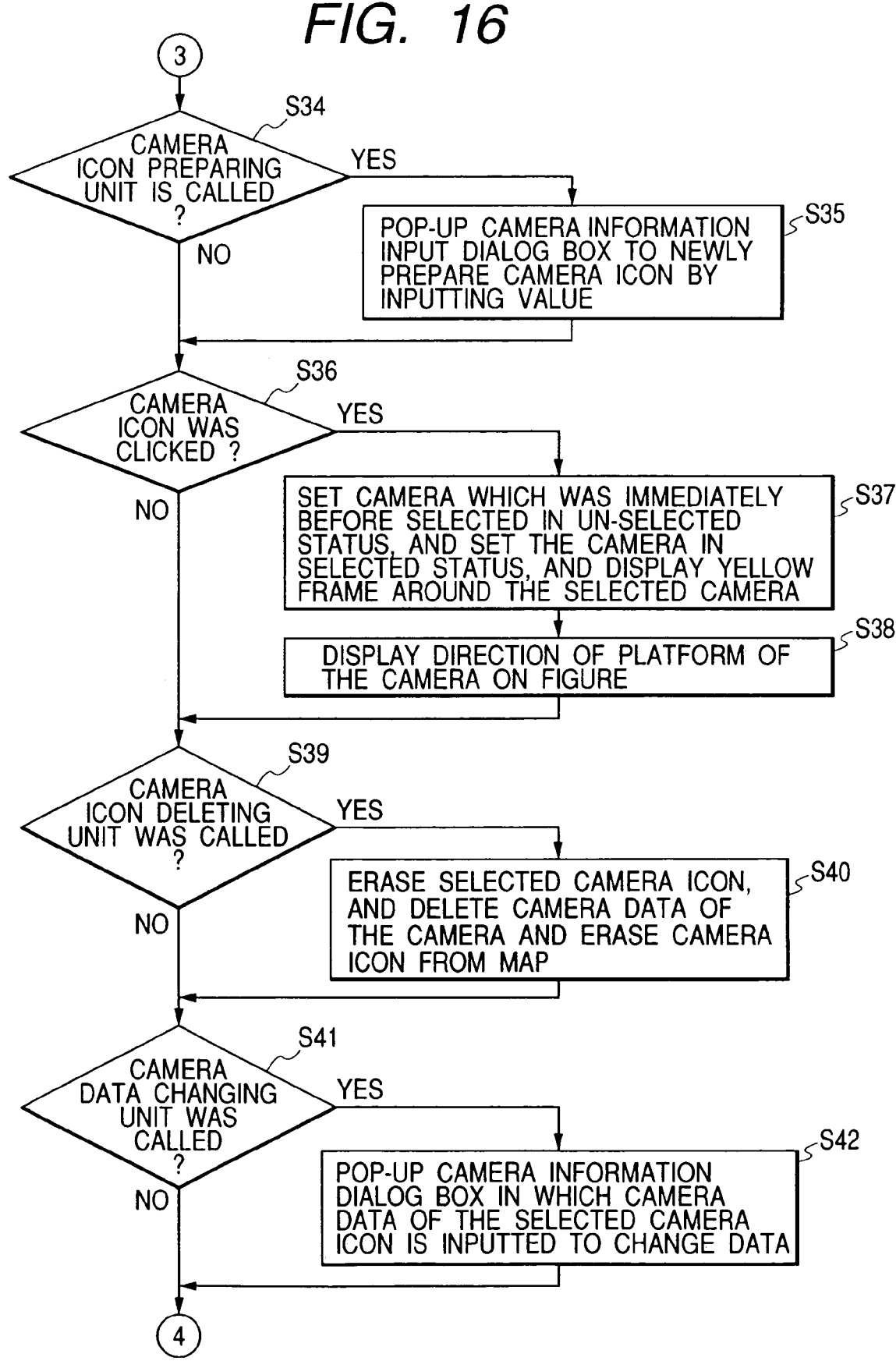
FIG. 16 is a flowchart showing the processing flow of the map editor in this embodiment, along with FIGS. 13 to 15 and 17.
Figure 17:
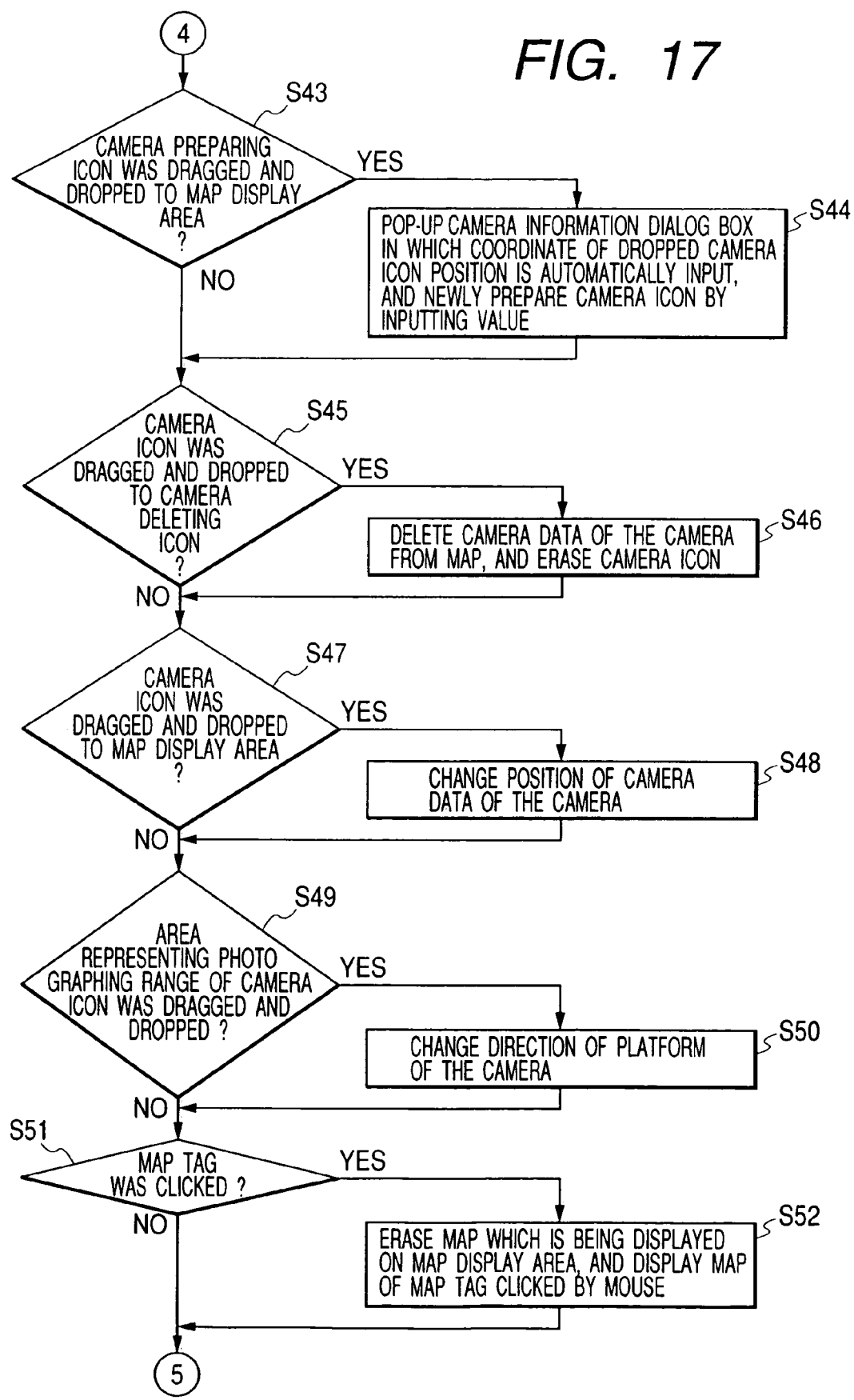
FIG. 17 is a flowchart showing the processing flow of the map editor in this embodiment, along with FIGS. 13 to 16.

Reference numeral 3120 denotes a map creation tag. If this tag is clicked, a map name dialog box 700 will appear, as shown in FIG. 12, enabling the creation of a new map. This will be described later. Reference numeral 3140 denotes a slider bar to scroll the bit map, the slider bar being displayed when the map display window 3110 is smaller than the size of bit map. Reference numeral 3150 denotes a camera creation icon. By dragging and dropping this icon 3150 over to the background bit map displayed in the map display area, a new camera icon can be disposed at any position on the background bit map. Reference numeral 3160 denotes a camera deletion icon. By dragging and dropping a camera icon synthesized on the background bit map displayed in the map display window 3110, the camera icon can be deleted. Reference numeral 3170 denotes a pull-down menu display area, in which all the functions of this map editor can be dealt with from the menu. In this embodiment, a "file" 3170*a*, a "map" 3170*b*, a "camera" 3170*c*, and a "help" 3170*d* are provided. The menu will be described later in detail.

Referring to a flowchart of FIGS. 13 to 17, a procedure of creating a map file using the map editor will be described below.

Figure 18:
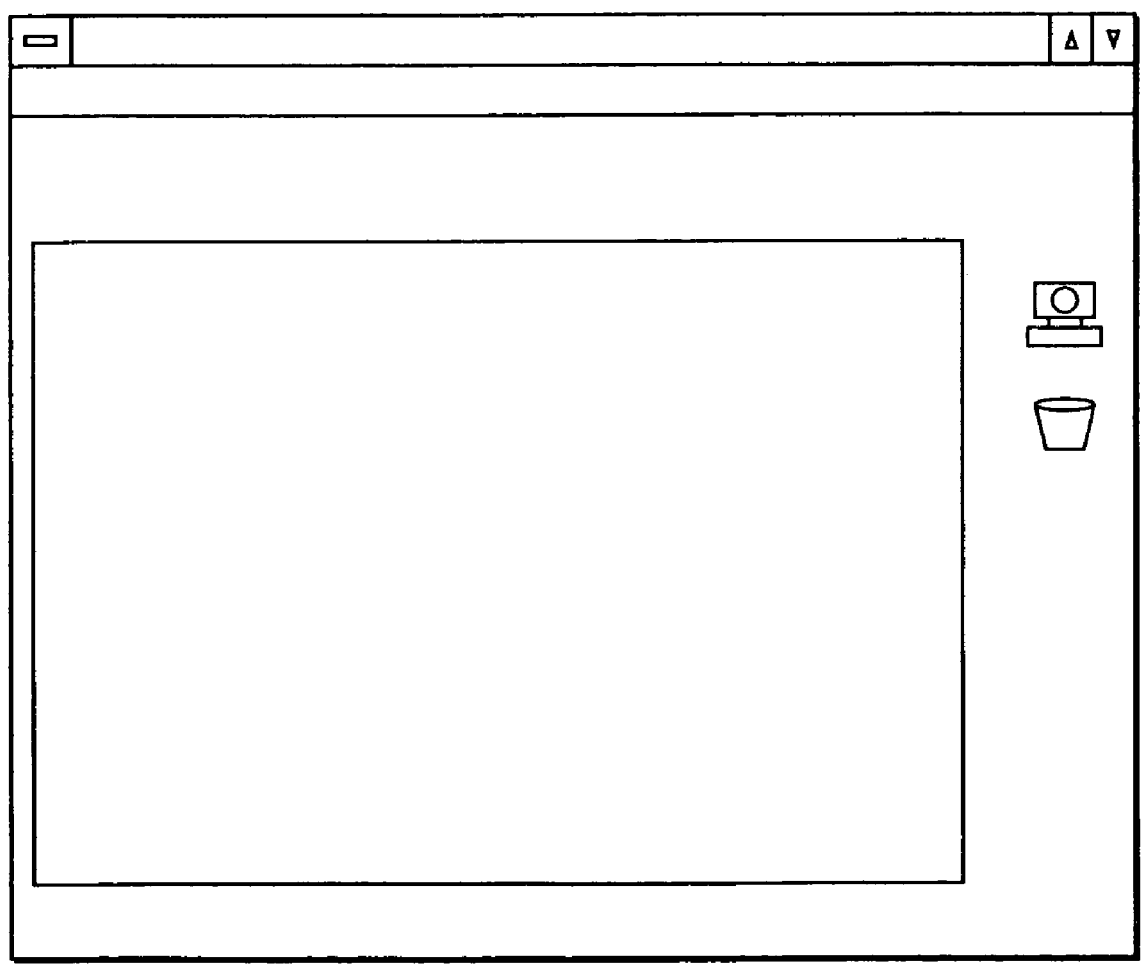
FIG. 18 is a view illustrating the display of the map editor in a state where the map file is closed.

If the map editor (application software) is started (S1), the map editor firstly determines whether or not it was terminated while a map file had been opened previously (S2). If so, the map file is opened automatically at the initiation to display the bit map and the camera icon (S3). Note that if the map editor was terminated with the map file closed, and thereafter the map editor is initiated, the map file is not automatically opened. At this time, a screen without the map creation tag 3120 and the map tags 3130, 3132, 3134 (FIG. 11) will appear, as shown in FIG. 18.

The edit operation of the map file is then performed, in which the creation of a new map file (S4 to S8) or the opening and editing of an already existing map file (S9 to S13) is performed.

Figure 19A:
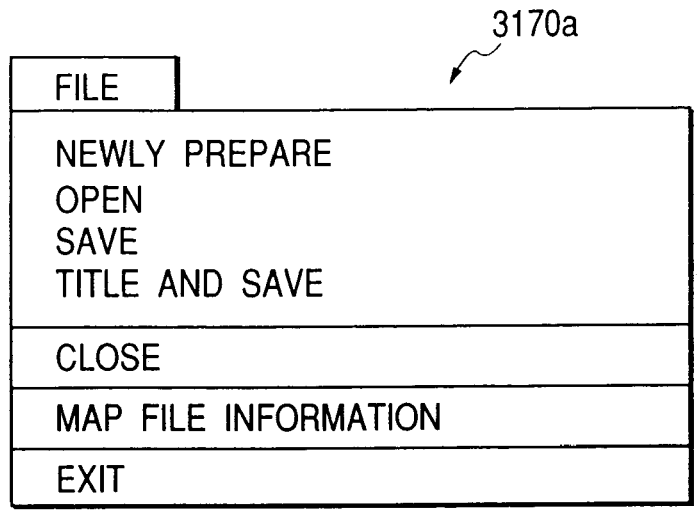
Figure 20:
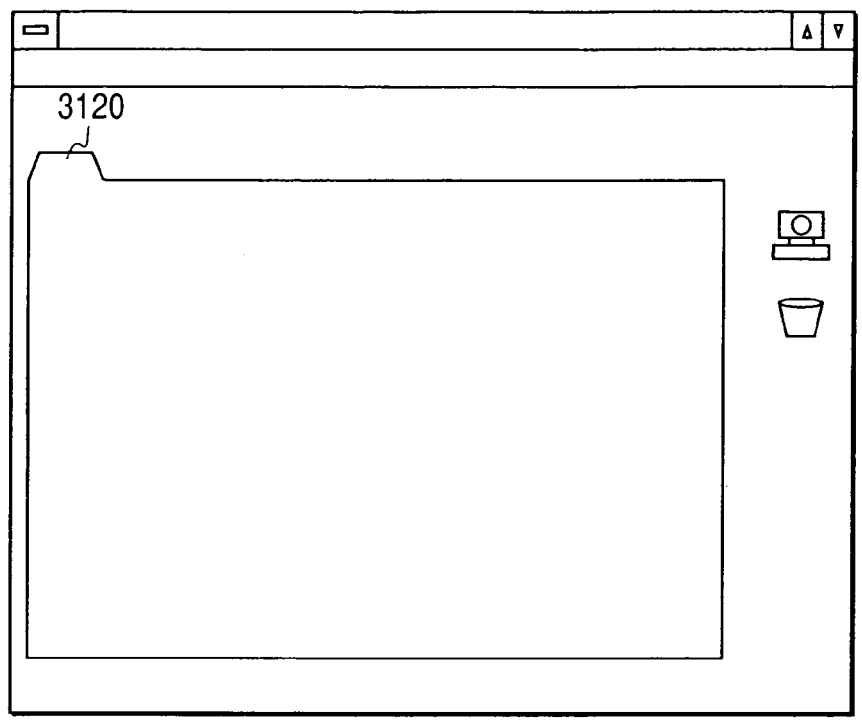
FIG. 20 is a view illustrating the display of the map editor in a state where the map file is newly created.

Firstly, a determination is made whether or not a new map file is created. Specifically, it is checked whether or not "New Creation" (map file preparing means) of the file menu 3170a which is a pull-down menu as shown in FIG. 19A is selected (clicked) (S4). If the "New Creation" is selected, a determination is made whether or not the map file being currently edited is untitled (S5). If untitled, the map file being opened is titled, stored and closed (S6). If the map file is titled, the map file is overwritten on the map file being opened, stored and closed (S7). And the editing of the untitled new map file is started (S8). Immediately after the new creation of map file is selected, a map creation tag 3120 will appear, as shown in FIG. 20, to enable the creation of a new map.

Figure 19B:
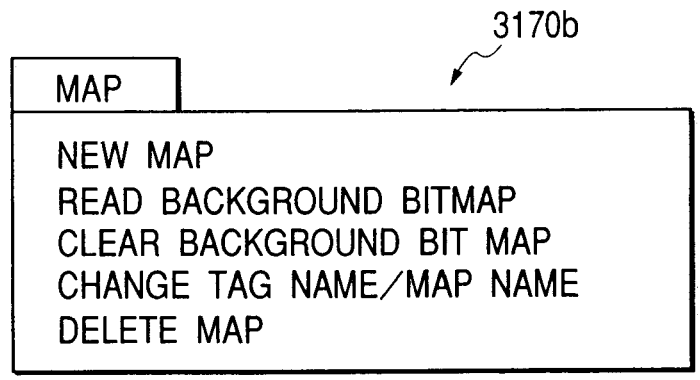

In order to create the new map, map preparing means is called. In this case, after passing through steps S9, S14, S16, S20, S21 and S23 in the flowchart, it is checked in step S25 whether or not new map preparing means is selected. Specifically, the map creation tag 3120 (FIG. 20) is clicked or the menu is used. For the menu, the "New Map" of the map menu 3170b which is a pull-down menu as shown in FIG. 19B is selected.

Figure 21:
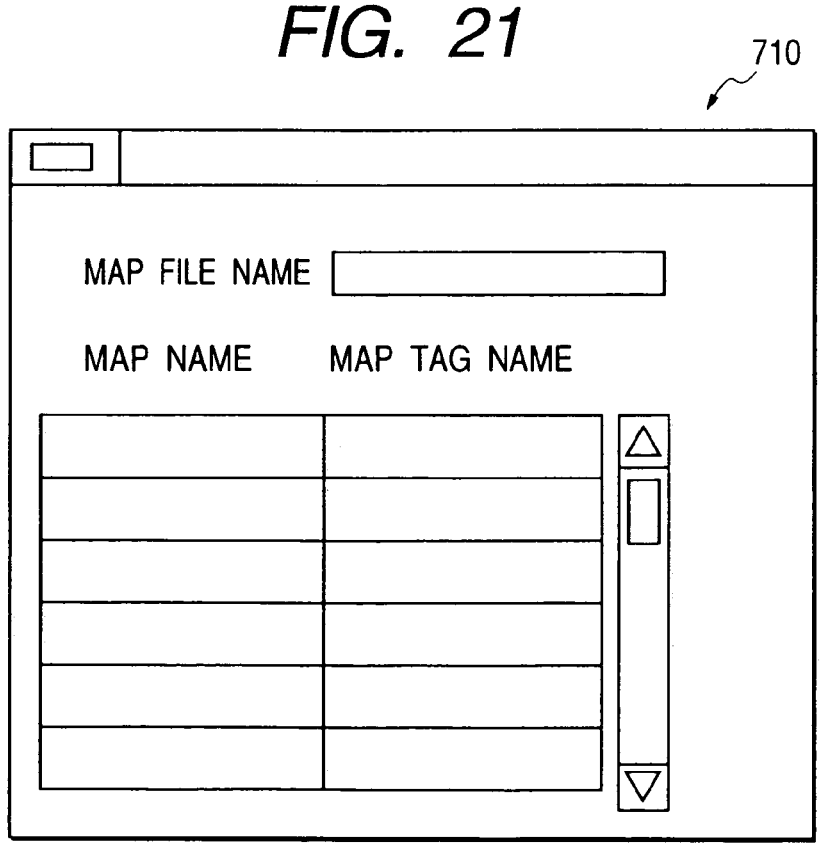
FIG. 21 is a view illustrating the display of a map file information box.

If the new map preparing means is selected, a map name input dialog 700 will pop up to enable the input of a map name and a map tag name, as shown in FIG. 12. Consequently, the new map can be created (S26). The map tag name is displayed on the map tag of the map, but the map name is not normally displayed on the screen (S27). When one wants to know the map name, the map tag name or the map file name, map information display means is called. Specifically, the "Map File Information" of the file menu 3170a as shown in FIG. 19A is selected. By this selection, it is determined that the map information display means has been selected (S21). And a map file information box 710 will appear to display a list of the actual fine name, the map name, and the map tag name of the map file being opened (S22), as shown in FIG. 21.

When the background of map is specified, a determination is made whether or not reading the file of background bit map is specified. Specifically, it is checked whether or not the "Read Background Bit Map" of the map menu 3170b is selected (S28), as shown in FIG. 19B. If the "Read Background Bit Map" is selected, the bit map of the map of the map file being opened is read (S29). The data of this bit map is stored in the secondary storage unit 126. The background does not have to be specified particularly, but unless specified, the background becomes plain. In this embodiment, this secondary storage unit 126 operates as first storage means.

Figure 22:
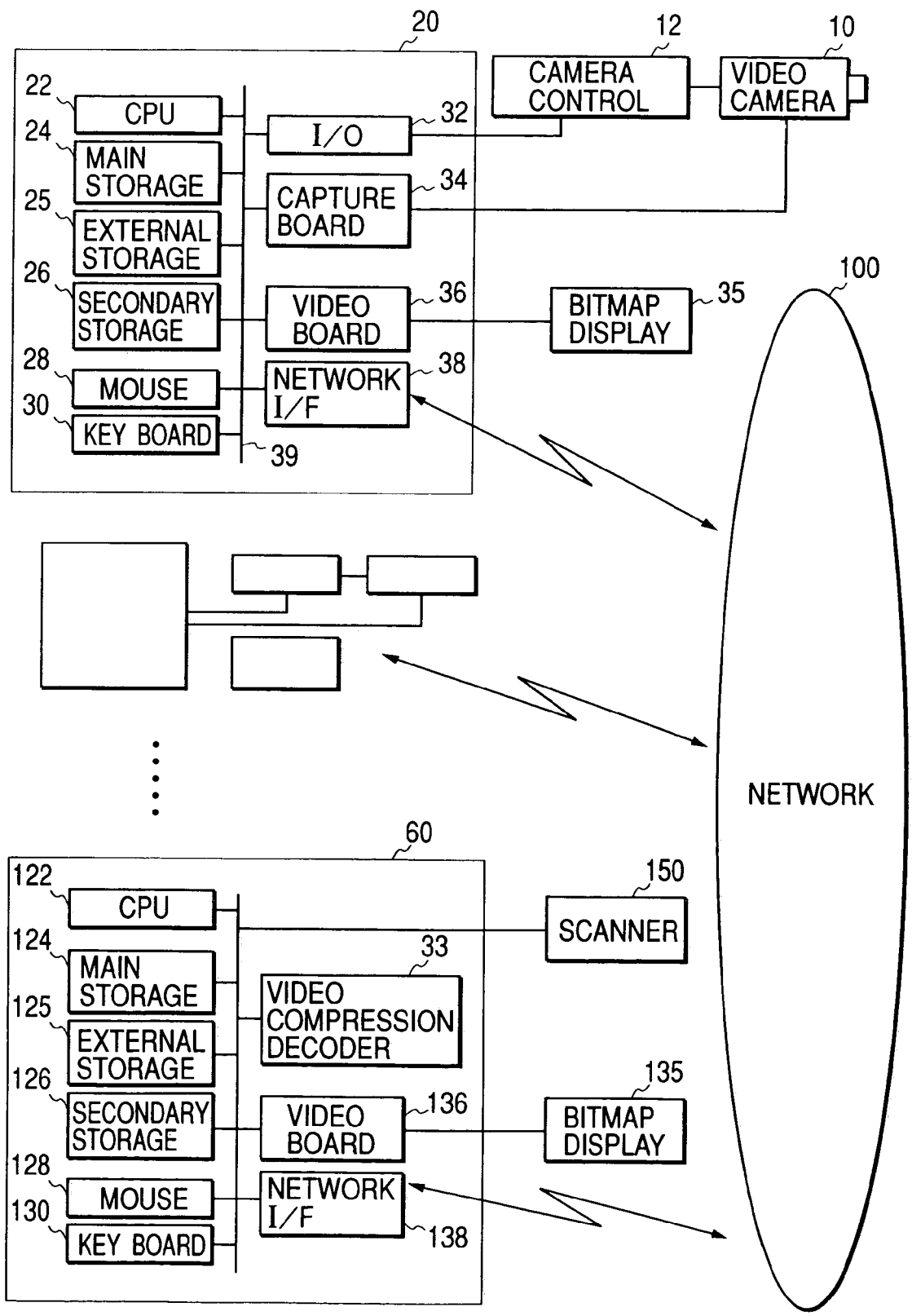
FIG. 22 is a diagram illustrating the system configuration in which a scanner (background bit map reading means) is further added to the configuration of FIG. 1.

Herein, the storage of bit map data will be described below. As shown in FIG. 22, a scanner 150 as an image reading unit (input means for reading the map) is connected to the monitor terminal 60 for initiating the map editor to enable the bit map of the map to be directly read. The data of the read bit map is stored in the secondary storage unit 126. In this way, the bit map can be read. This scanner 150 is connected to the monitor terminal 60, but may be connected to the image transmission terminal 20 so that the monitor 60 can receive the data via the network 100. In the above example, the data of the bit map is once stored in the secondary storage unit 126. However, when the "Read Background Bit Map" is selected, the data read by the scanner 150 may be directly handled. Note that the information read by the scanner 150 should be stored in the secondary storage unit 126 for later use.

A drawing tool (map preparing means) as an application software may be used to create the background bit map, rather than the image reading unit such as a scanner to read the data. This drawing tool may be added to the menu 3170 to enable the simpler initiation. The data of the background bit map created by this drawing tool is stored in the secondary storage unit 126 to enable the bit map to be read, as described above. This drawing tool may be a separate application outside the system. In this case, it is convenient to have a function of converting the screen data created by the drawing tool into the format usable with this system, and reading the data.

The creation of a camera icon will be described below.

Figure 19C:
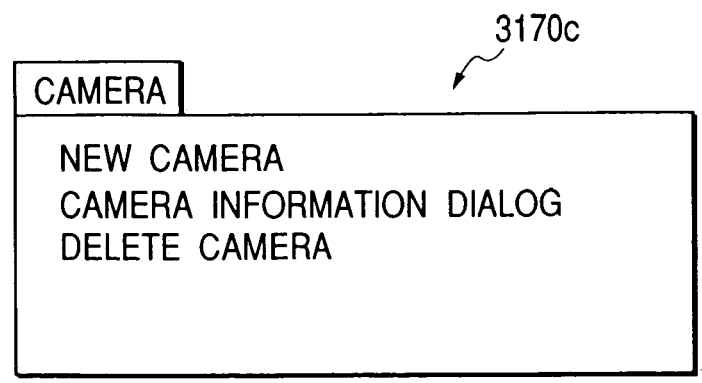
Figure 23:
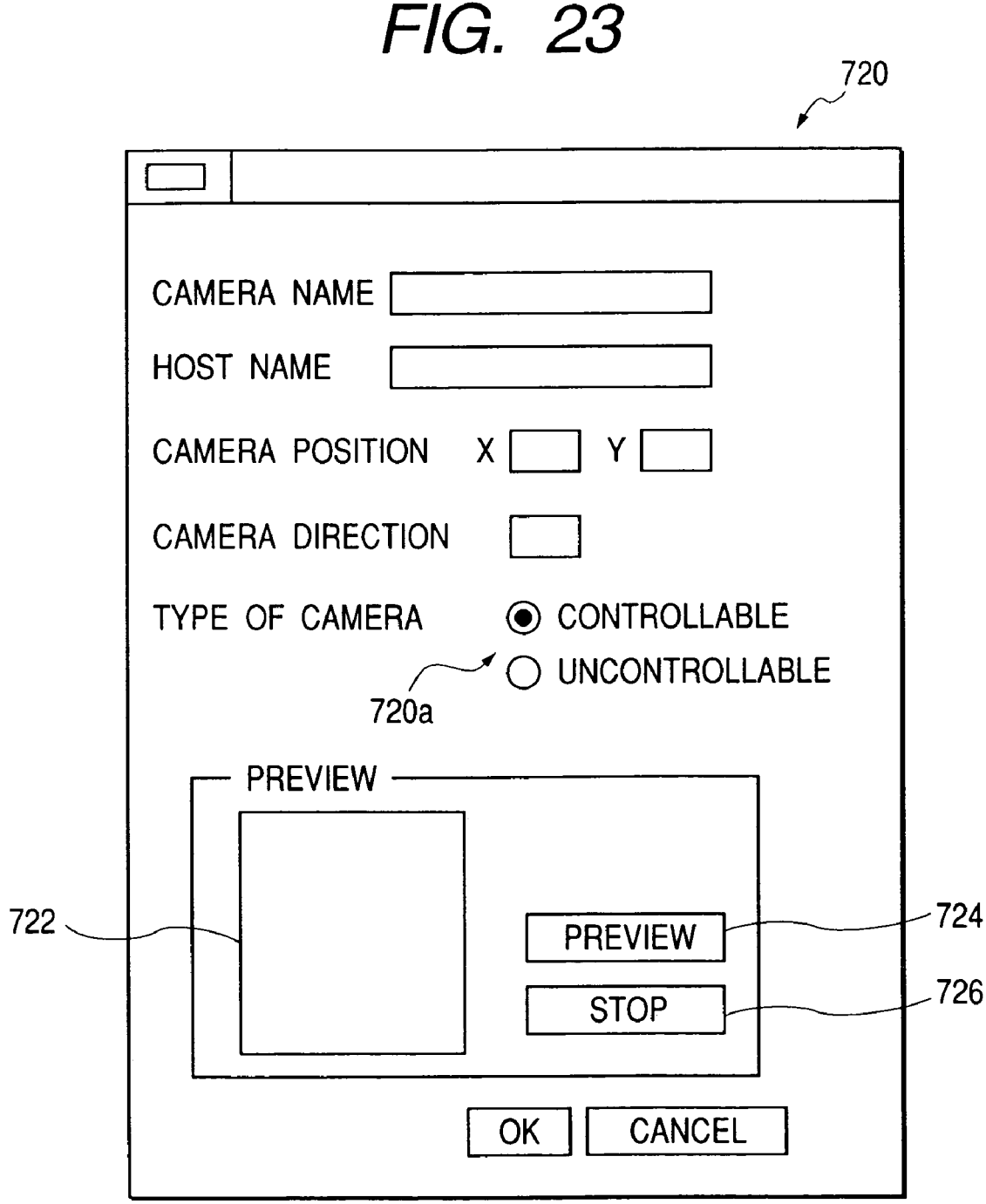
FIG. 23 is a view illustrating the display of a camera information dialog.

In order to newly create the camera icon of a camera of interest, camera icon preparing means is called from the menu, as required. Specifically, the "New Camera" of the camera menu 3170c as shown in FIG. 19C is selected. If it is determined that the "New Camera" has been selected (S34), a camera information dialog 720 as shown in FIG. 23 will automatically pop up. Here, by editing the camera data such as the position and direction of camera icon, the camera icon is newly created (S35). The information including the position and direction of the camera icon is utilized as the information in controlling the camera, or synthesizing the camera icon for display.

In the camera information dialog 720, one can set up the camera name, the host name, the position of camera, the direction of platform (optical axis of camera) and the type of camera. The position of camera is indicated by XY coordinates in the background bit map, and the direction of platform is indicated by an angle from 0 to 360° with reference to a positive direction of the X axis. Also, the type of camera, i.e., whether or not the platform is electrically controllable, can be chosen using a radio button 720a under the camera information dialog 720.

By doing this processing, the information regarding the camera when installed, such as the set position of camera and the direction of platform can be input and stored in association with the map.

Reference numeral 722 denotes an image preview display for displaying the image of camera for confirmation. Reference numeral 724 denotes a preview button for displaying the image on the image preview display.

If the preview button 724 is depressed after a host name is input, the map editor starts the communication with the image transmission software 422 having the host name, so that the image photographed by the camera is displayed dynamically on the image preview display 722. Reference numeral 726 denotes a preview stop button for stopping the preview display.

Figure 29:
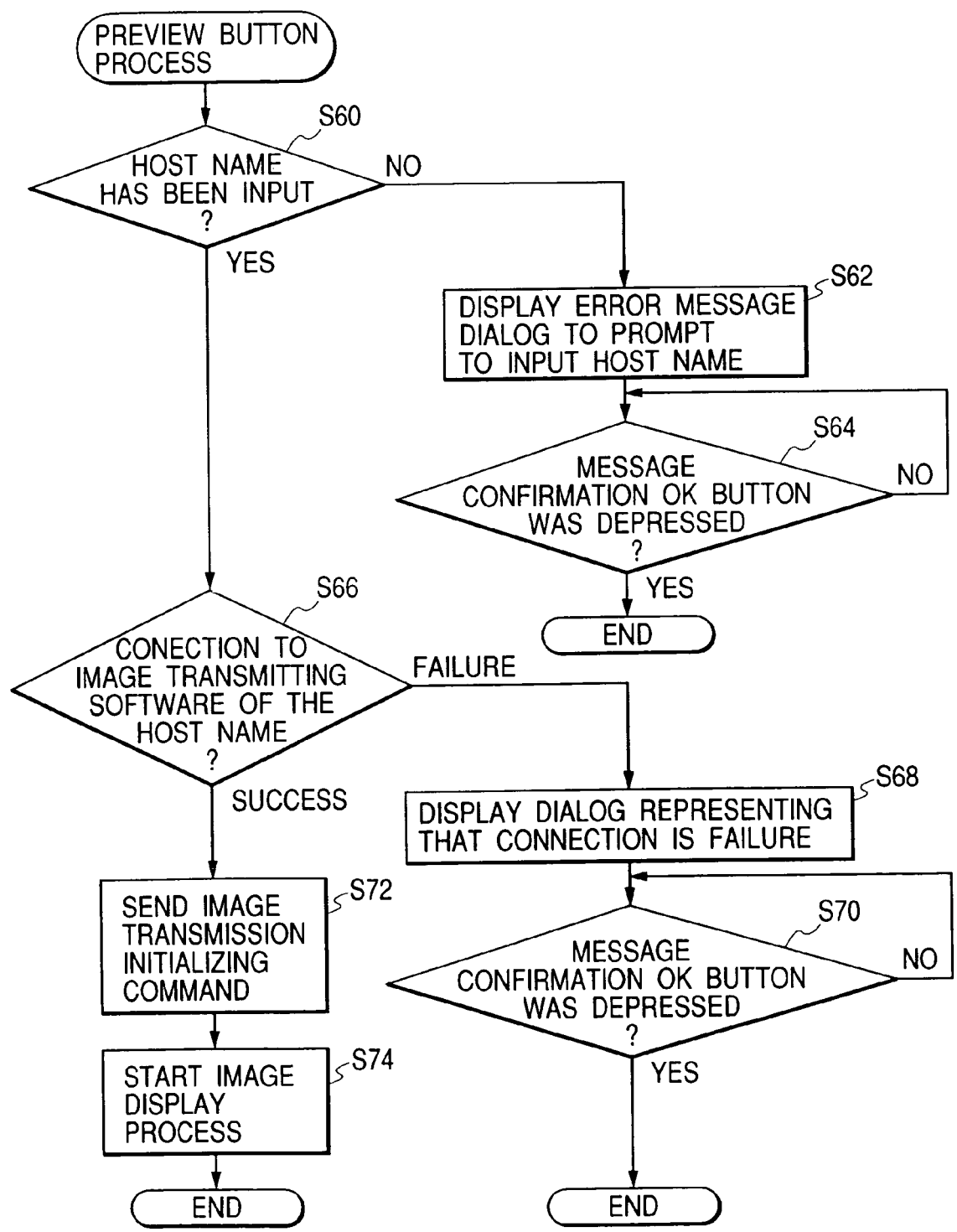
FIG. 29 is a flowchart showing the procedure of image preview.

Referring to a flowchart of FIG. 29, a procedure of image preview will be described below.

If the preview button 724 is depressed, it is checked whether or not the host name has been input (S60). If not, an error message for prompting the user to enter the host name is displayed (S62). If a message confirmation OK button has been depressed (S64), the processing is ended. In step S60, if there is a host name input, the map editor tries to connect to the image transmission software 422 of the host name (S66).

If the map editor fails the connection, an error message is displayed (S68). If the message confirmation OK button has been depressed (S70), the processing is ended. In step S66, if the map editor succeeds in the connection, an image transmission initializing command is sent to the image transmission software 422 (S72). An image display process is started (S74). Thereafter, the image display process is called periodically when the operator is not using the mouse or keyboard. The image display process is performed by sending one image request command to the image transmission software 422, and receiving and displaying one image data transmitted on the image preview display 722.

By repeating this process periodically, the image of camera is displayed dynamically. If the operator depresses the preview stop button 726 or closes the camera information dialog 720, the image display process is ended. The connection with the image transmission software 422 is cut off.

The image preview display may be arranged in a special window separately provided, or beside the camera icon on the map, but not on the camera information dialog.

By inputting the information concerning the position and direction of camera with reference to this preview, one can confirm to what extent of area the camera can actually photograph to correctly reflect the status of camera on the map, and therefore input the information concerning the position of camera or the walking.

The position and direction of camera icon on the map can be determined, depending on the resultant information of inputting the position and direction of camera. Hence, the operator can discriminate the status of camera by confirming the position and direction of camera icon on this map.

If the camera icon is not newly created, the camera menu 3170c can be displayed by selecting the camera icon (e.g., 3180 in FIG. 11) already displayed on the bit map. From this menu which is displayed, the "Camera Information Dialog" (camera data changing means) is selected (S41). Then, the camera information dialog 720 will pop up to change the camera data of the camera selected by the camera icon (S42).

Figure 24:
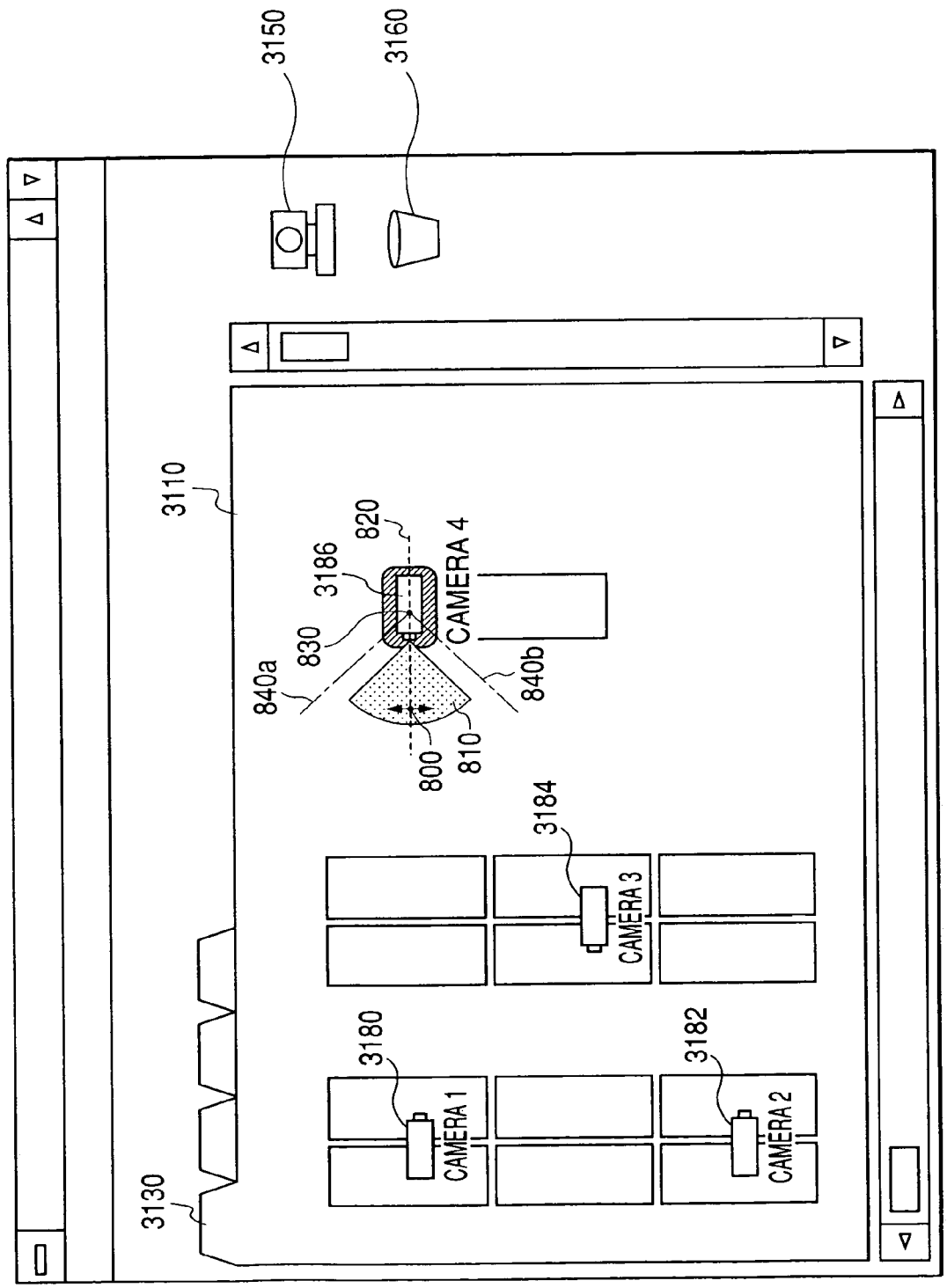
FIG. 24 is a view illustrating the display of the map editor when the camera icon is selected.

The selection of camera icon can be made by clicking the camera icon (S36). The selected camera icon 3186 is fringed with yellow (or black in the figure) to make it easier to see which camera icon is selected, as shown in FIG. 24. Since only one camera icon can be selected at a time, the yellow fringe of camera icon selected previously will disappear by selecting another camera icon (S37). If the camera icon has been selected, a control pointer 800 to indicate the direction of platform or a fan shape 810 indicating the photographing area is drawn around an extension line 820 in the direction of platform. Herein, the fan shape indicating the photographing area is drawn, but since it is essential that the direction of platform can be seen at a glance, the arrow indicating the direction of platform may be only provided. Also, the pan angle range of a carrier is limited (normally 180° or below). Therefore, when the camera is selected to be controllable in the camera information dialog 720 as shown in FIG. 23, the pan angle with respect to the direction of camera may be indicated by the lines 840a, 840b in FIG. 24. Consequently, the pan operation can be facilitated using the camera icon. This pan angle may be also entered in the camera information dialog 720 as shown in FIG. 23. This data is stored in the main storage unit 24.

Likewise, if the camera icon (e.g., 3180 in FIGS. 11 and 24) is selected, the camera menu 3170C can be displayed. If the "Camera Delete" is selected from this menu displayed (S39), the selected camera icon can be erased from the window, the camera data of the camera deleted from the map, and the unnecessary camera icon deleted (S40).

The creation or deletion of the camera icon can be performed by calling the corresponding means from the menu, but may be made by the D & D with the mouse.

The creation of the camera icon is performed as follows. By dragging and dropping a camera creation icon 3150 (FIG. 24) over to a map display area (map display window 3110) (S43), the camera information dialog 720 will pop up, in which the coordinates at which the camera icon is dropped are automatically input as the position of camera icon. And by inputting the parameters other than the position and depressing the OK button, the camera information dialog 720 will pop down, so that a new camera icon can be created.

On the other hand, the deletion is performed as follows. By dragging and dropping the camera icon (e.g., 3180 in FIG. 24) over to a camera deletion icon 3160 (S45), the camera data of the camera is deleted from the map, and the camera icon is erased from the map display area (map display window 3110) (S46).

The positional movement of camera icon or the directional change of platform can be effected not only by using the camera information dialog 720 but also by the D & D with the mouse.

The positional movement of camera icon can be effected by dragging and dropping the camera icon (e.g., 3180 in FIG. 24) over to the map display area (map display window 3110) (S47) and changing the position of camera data for the camera (S48).

The directional change of platform can be effected by dragging and dropping the control pointer 800 displayed on the extension line 820 indicating the direction of camera icon in FIG. 24 (S49) and changing the direction of platform for the camera data of the camera (S50). Of course, the range where the control pointer 800 can be displayed is fixed on the circumference of a circle having a certain radius around a rotational axis 830 of the camera icon.

Figure 25:
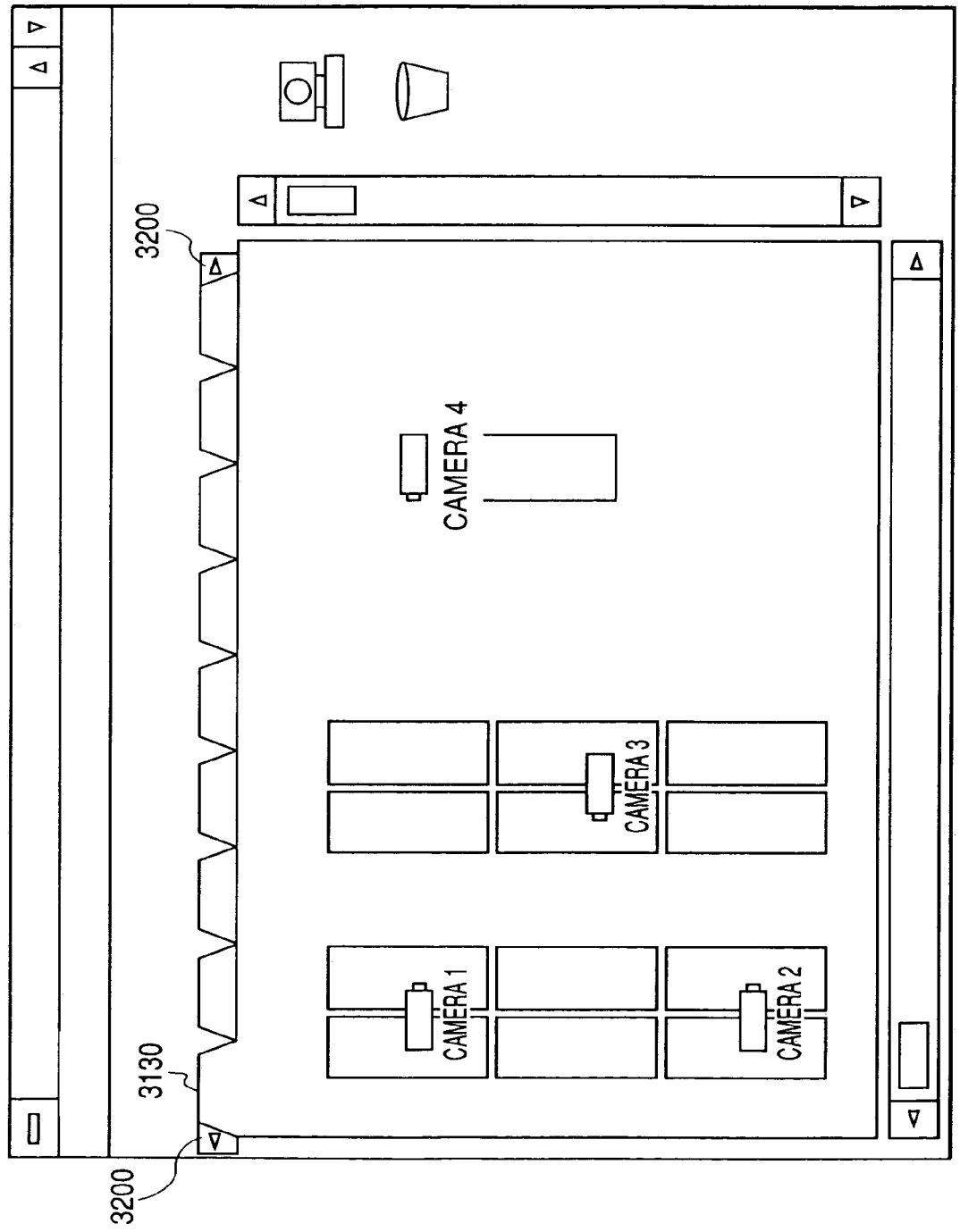
FIG. 25 is a view illustrating the display of the map editor when a map tag scroll bar is displayed.

In editing the map file having a plurality of maps, when it is desired to switch the map, the map tag (e.g., 3130 in FIG. 24) of the map to be switched is clicked (S51). Consequently, the map data of the map and the camera data are drawn by synthesizing the bit map and the camera icon on the map display area (S52). In the case where there are so many sheets of maps as to have the width of map display window beyond the total of map tag widths, a tag scroll button 3200 is displayed on either side of the map tag, as shown in FIG. 25. By clicking this tag scroll button 3200, the whole tag can be scrolled in the direction of the arrow of the button 3200.

When the map name or map tag name is changed or when the unnecessary map is deleted, the operation is as follows.

When the map name or map tag name is changed, a determination is made whether or not map name or map tag name changing means (specifically, "Change Tag Name/Map Name" of the map menu 3170b in FIG. 19B) is clicked (S30). If clicked, the map name and the map tag name are input into the map name dialog box 700 which has popped up to execute the renewal process (S31). The map menu 3170b may be also called by double-clicking the map tag.

When the unnecessary map is deleted, a determination is made whether or not map deleting means (specifically, "Delete Map" of the map menu 3170b in FIG. 19B) is clicked (S32). If clicked, the map data, the camera data and the map tag of the map are deleted (S33).

If the editing of the map file is ended, the map file is saved so that an actual text file is created in the secondary storage unit. This process is as follows.

A determination is made whether or not the edited map file overwriting means (specifically, "Overwrite" of the file menu 3170a in FIG. 19A) is selected (S16). If selected, it is checked whether or not the map file being currently edited is untitled (S17). If untitled, the map file being opened is titled and saved to continue editing (S18). If the map file being currently edited is titled, it is overwritten and saved on the map file being opened to continue editing (S19).

In the case where the edited map file is titled and saved, a determination is made whether or not the "Title and Save" of the file menu 3170a in FIG. 19A is selected (S20). If selected, the map file being opened is titled and saved to continue editing (S18).

After editing the map file, if it is desired that the map editor is still operative, but the unnecessary change of the map is avoided, the map file may be closed. This process is as follows.

That is, a determination is made whether or not the "Close" of the map menu 3170a in FIG. 19A is selected. If selected, its map file is closed (S15). If the map file has been closed, the operation except for the new creation and opening of map file, and the termination of the map editor is inhibited.

If all the operation is completed, the map editor is ended. This process is as follows.

If a button 3210 of the map editor in FIG. 11 is clicked, a menu including the "Move" and "End", not shown, will appear. A determination is made whether or not the "End" of this menu is selected (S23). If selected, the map editor is ended (S24). Note that the "End" of the file menu 3170a can effect the same processing. In ending, the map editor stores whether or not the map file is being edited, and the map file name into an initial setting file. The initial setting file is referred to when starting the map editor.

With this embodiment, the map editor allows the map file to be simply edited.

The above process can be performed by the CPU 22 in accordance with a program (software) stored in the secondary storage unit 26 and based on the data stored in the main storage unit 24.

A modified embodiment involves an example of the operation of the map editor in the case where a switching device between the RS signal and the analog image signal, called a "switcher", and a device for switching the analog image signal and synthesizing four screens, called a "synthesizer", are connected to the image transmission terminal 20, and up to four video cameras can be mounted. This embodiment is different from the above-mentioned embodiment in two respects of the display form in selecting the camera icon and that more data can be input in the camera information dialog.

Figure 26:
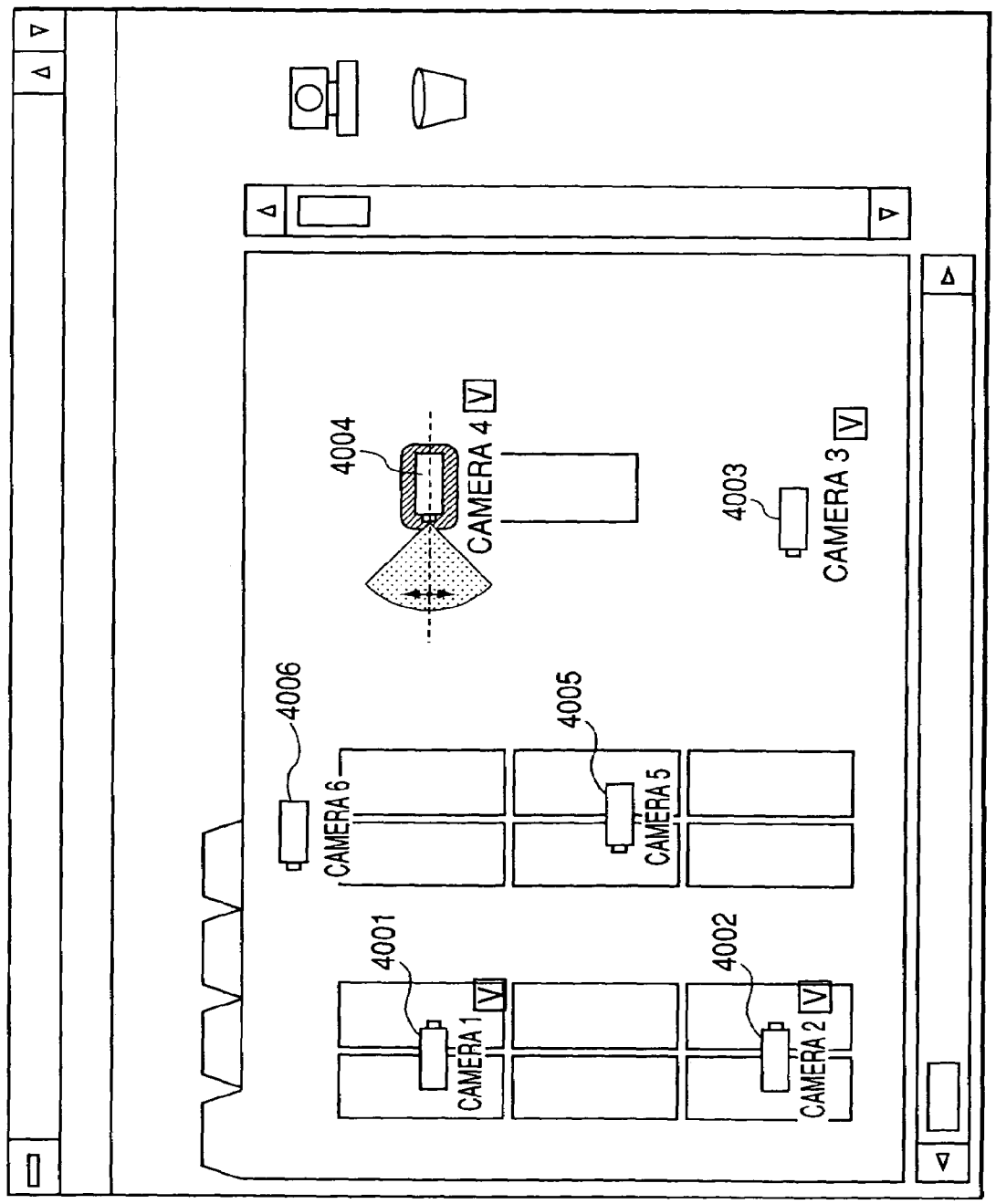
FIG. 26 is a view illustrating the display of the map editor when the camera icon of a camera connected to a switcher and a synthesizer is selected.

In FIG. 26, the camera icon of the video camera connected with the switcher and the synthesizer has been selected. The camera icons 4001 to 4004 represent a video camera connected with the same switcher and synthesizer, and the camera icons 4005, 4006 represent another video camera. Herein, FIG. 26 shows a state immediately after a camera icon 4004 has been clicked.

As described previously, only one camera or camera icon corresponding to this camera is selectable, and the selected camera icon 4004 is fringed with yellow, as in the previous embodiment. In this embodiment, a "V" mark indicating that connection with the switcher and the synthesizer is displayed at the lower right part of the camera icon 4004. Further, the camera icons 4001, 4002, 4003 of the video camera connected with the same switcher and synthesizer as those of the video camera indicated by the camera icon 4004 have the "V" mark displayed at the lower right part in the same way.

Figure 27:
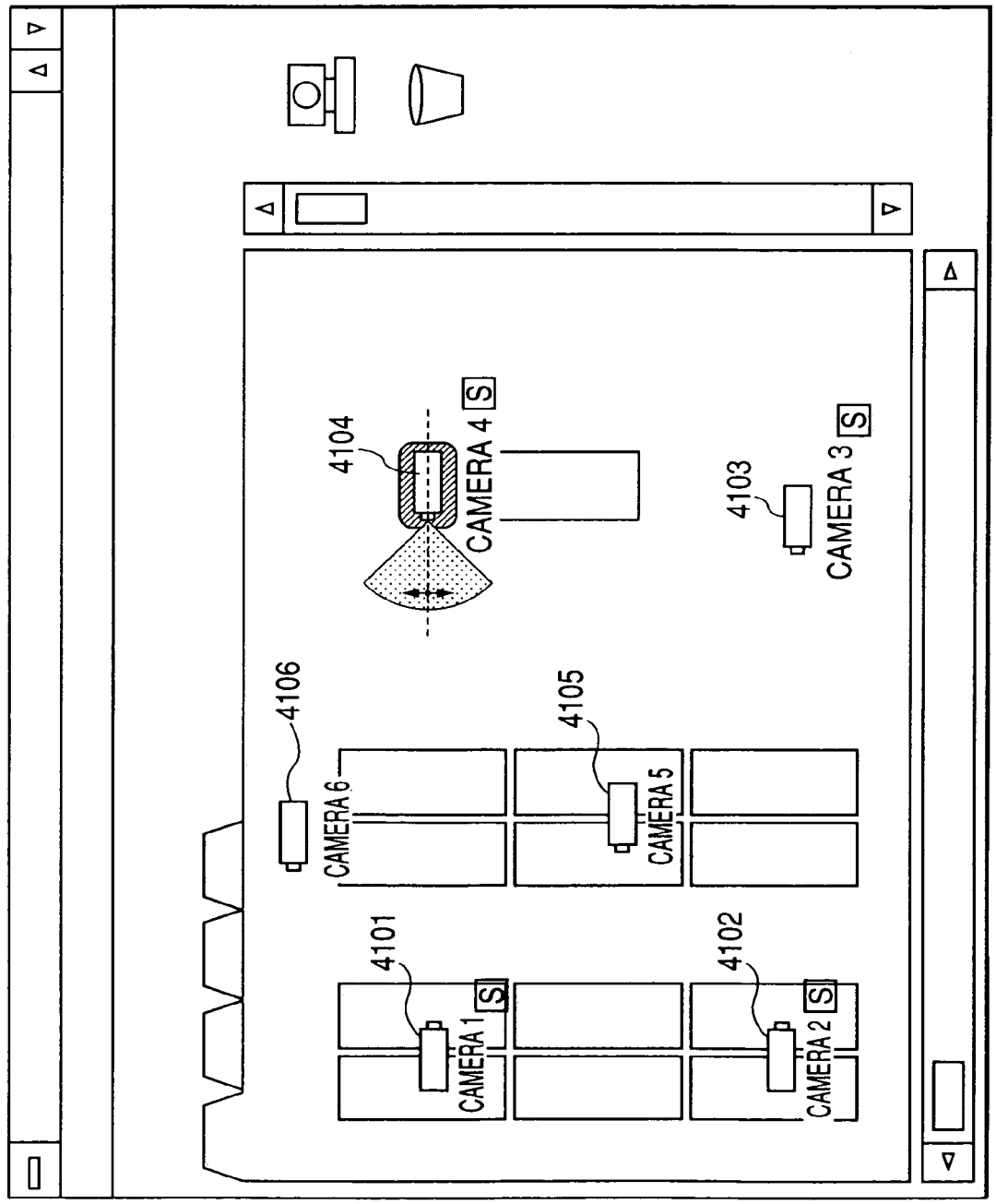
FIG. 27 is a view illustrating the display of the map editor when the camera icon of a camera connected to the switcher is selected.

FIG. 27 shows a state where the camera icon of the video camera connected with the switcher alone has been selected. The camera icons 4101 to 4104 represent the video camera connected with the same switcher, and the camera icons 4105, 4106 represent another video camera. Herein, FIG. 27 shows a state immediately after a camera icon 4104 has been clicked.

In this embodiment, like the embodiment as shown in FIG. 26, the selected camera icon 4104 is fringed with yellow. At the same time, an "S" mark indicating the connection with the switcher is displayed at the lower right part of the camera icon 4104. Further, the "S" mark is also displayed at the lower right part of the camera icons 4101, 4102, 4103 of the video camera connected with the same switcher as that of the video camera indicated by the camera icon 4104.

Figure 28:
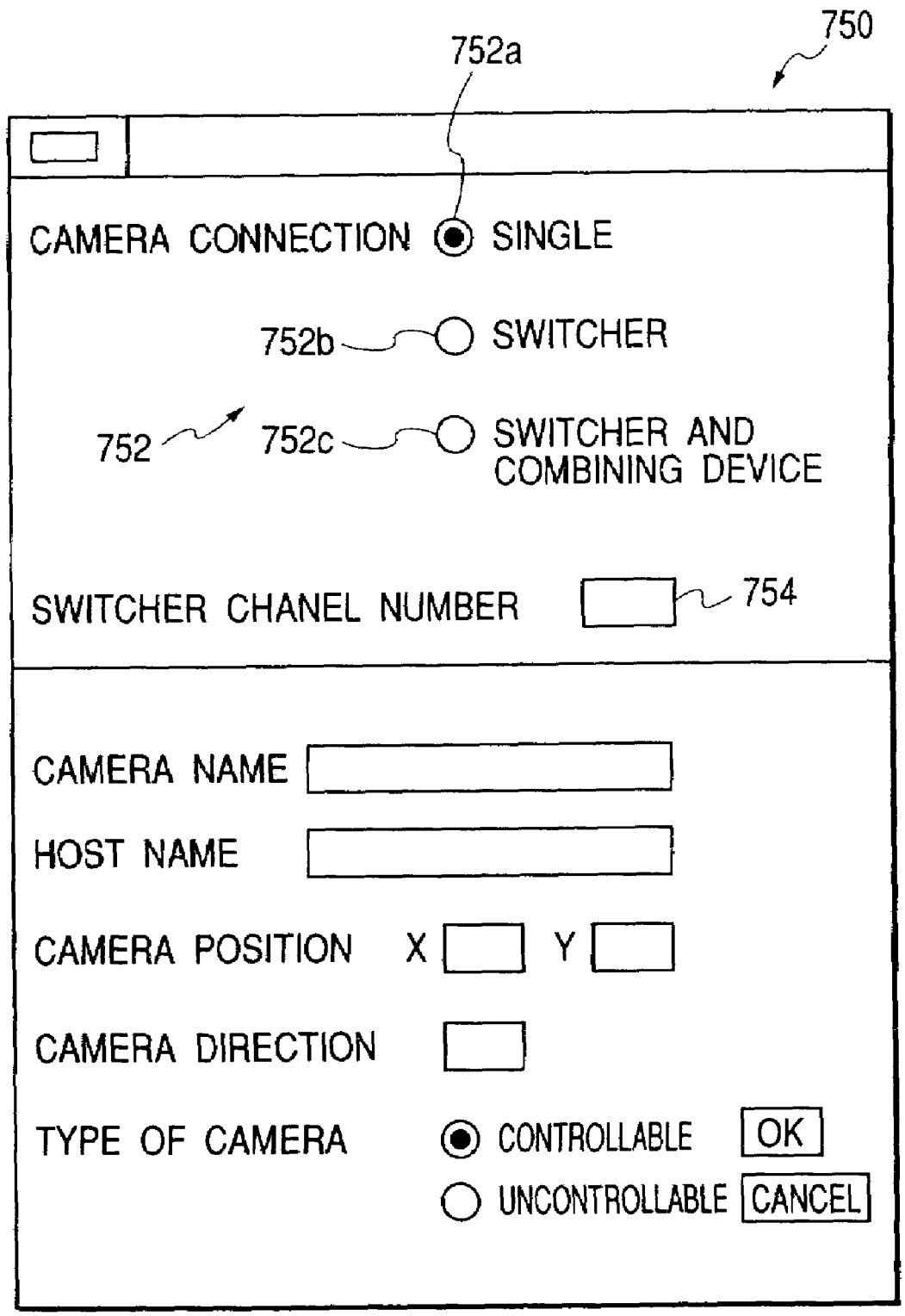
FIG. 28 is a view illustrating the display of a camera information dialog in a system in which the camera is connected to the switcher and the synthesizer.

In the case where the switcher and the synthesizer are taken into consideration as in this modified embodiment, it is preferable that the camera information dialog for inputting and changing the camera data is displayed in the form of FIG. 28. The camera information dialog as shown in FIG. 28 has additionally a radio button 752 (752a, 752b, 752c) for designating the connection form of camera (single, switcher, switcher and synthesizer), and a switch channel number dialog box 754 for designating which control I/O of the switcher the selected camera icon is connected to, in contrast to the camera information dialog 720 as shown in FIG. 23. That information is referred to when the camera control client 411 (FIG. 2) sends a camera control command to the camera control server 421, and when the map management software 413 displays the camera icon.

With the above embodiments, the map file which is a text file can be effected with WYSIWYG easily and in short time.

As described above, when the information of the camera including the position of camera is associated with the map, the image data photographed by the camera can be referred to. Therefore, it is possible to associate the information with the map in consideration of the image data being photographed.

Also, the information of the direction of camera can be associated with the map securely. Further, considering the image data being photographed, the camera control from the correct map can be effected in which the position and direction of symbol corresponding to the camera on the map can be determined from the associated information, and the map having the correct symbol can be obtained.

Second Embodiment

A second embodiment of the present invention will be described below with reference to the drawings.

Figure 30:
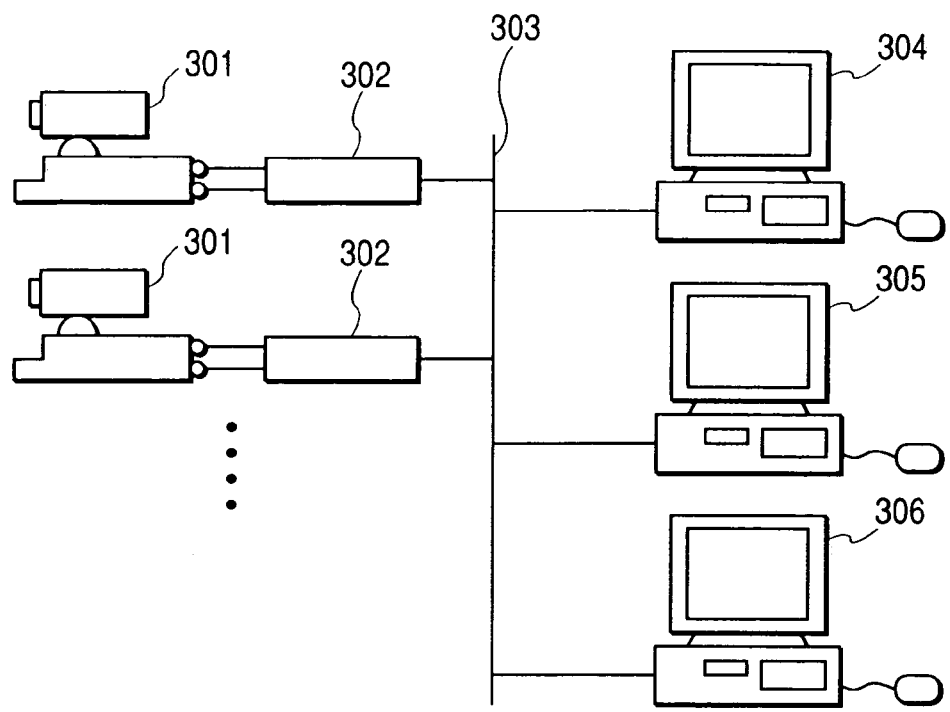
FIG. 30 is a configuration diagram of a remote monitoring system in a second embodiment.

FIG. 30 is a block diagram of a remote monitoring system in this embodiment. Reference numeral 301 denotes a camera which can control the pan, tilt and zoom. Reference numeral 302 denotes a network adapter for digitizing an image input from the camera 301, compressing the image data in the form of Motion-JPEG, and transmitting the compressed data to a network. The network camera adapter 302 controls the camera 301 in serial communication, based on a control command received from the network. Reference numeral 303 denotes a network through an Internet protocol such as Ethernet.

A plurality of pairs of camera 301 and network camera adapter 302 (each pair referred to as a camera station) are connected to the network 303. The different kinds of camera 301 and network adapter 302 may be mixed. It is desirable that the network adapter 302 can accord with the automatic detection protocol for network equipment such as Universal Plug and Play (UPnP).

Reference numeral 304 denotes a monitoring station using a personal computer. The monitoring station 304 receives, decodes and displays an image from the network camera adapter 302 through the network 303. Also, the monitoring station 304 transmits a camera control command for the pan, tilt or zoom to the network camera adapter 302 in response to an operation of the mouse, joy stick or keyboard. A plurality of monitoring stations 304 may be also connected to the network 303.

Reference numeral 305 denotes a managing station using a personal computer. Reference numeral 306 denotes a server using a personal computer. The managing station 305 manages the name, network address, and type of each camera station connected to the network 303, and stores the management data in the XML format into the server 306. Also, the managing station 305 designs a monitoring screen to be displayed on the monitoring station 304, and stores the screen style data in the XSL format, and the image disposition data and the camera layout (camera map) in the XML format into the server 306.

The server 306 may be a Web server or a file server. Any combination of monitoring station 304, managing station 305 and server 306, or all of them, may be configured by one personal computer.

Figure 31:
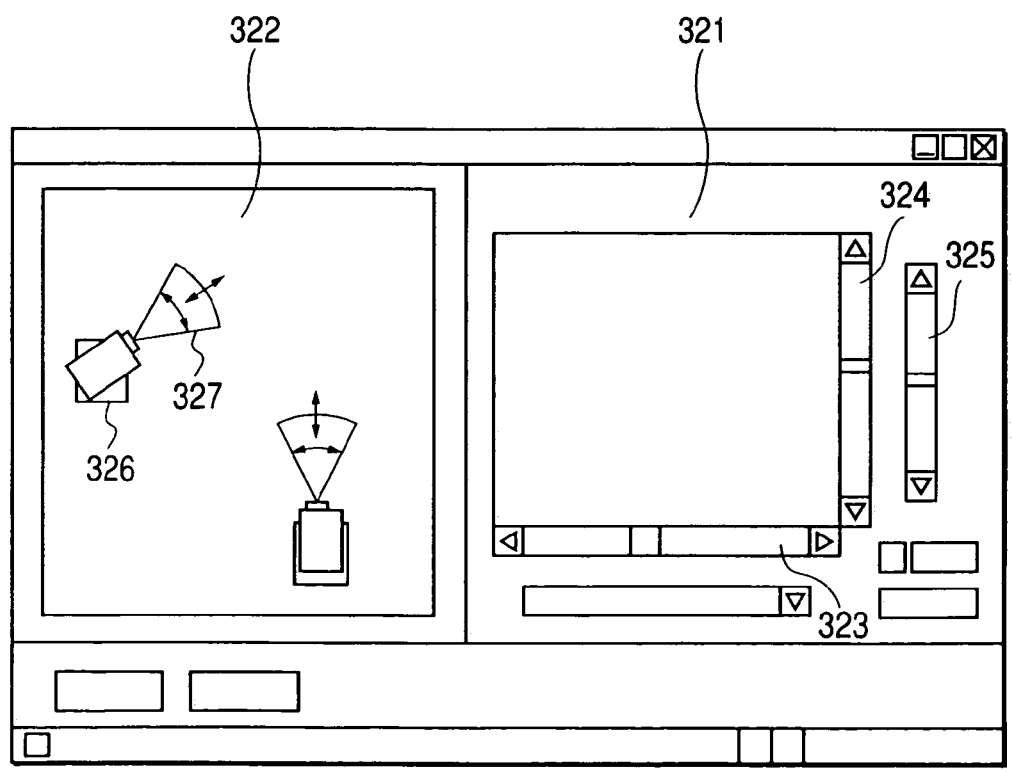
FIG. 31 is a view illustrating a screen (monitoring screen) of a monitoring station 304.

FIG. 31 illustrates an example of a screen (monitoring screen) of the monitoring station 304. Reference numeral 321 denotes an image viewer for displaying the image of camera. Reference numeral 322 denotes a map viewer for displaying the camera map. Reference numerals 323, 324 and 325 denote the scroll bars for pan, tilt and zoom of the camera, respectively. Reference numeral 326 denotes a camera icon indicating the camera on the camera map. Reference numeral 327 denotes a scope icon indicating the photographing direction and range of the camera. By clicking the camera icon 326, the image of camera can be switched. Also, by operating on the scope icon 327 with the mouse, the pan, tilt or zoom of camera can be effected. In addition to these operation buttons, various operation portions for backlight correction, preset selection, snap shot, and panorama display may be provided.

Figure 32:
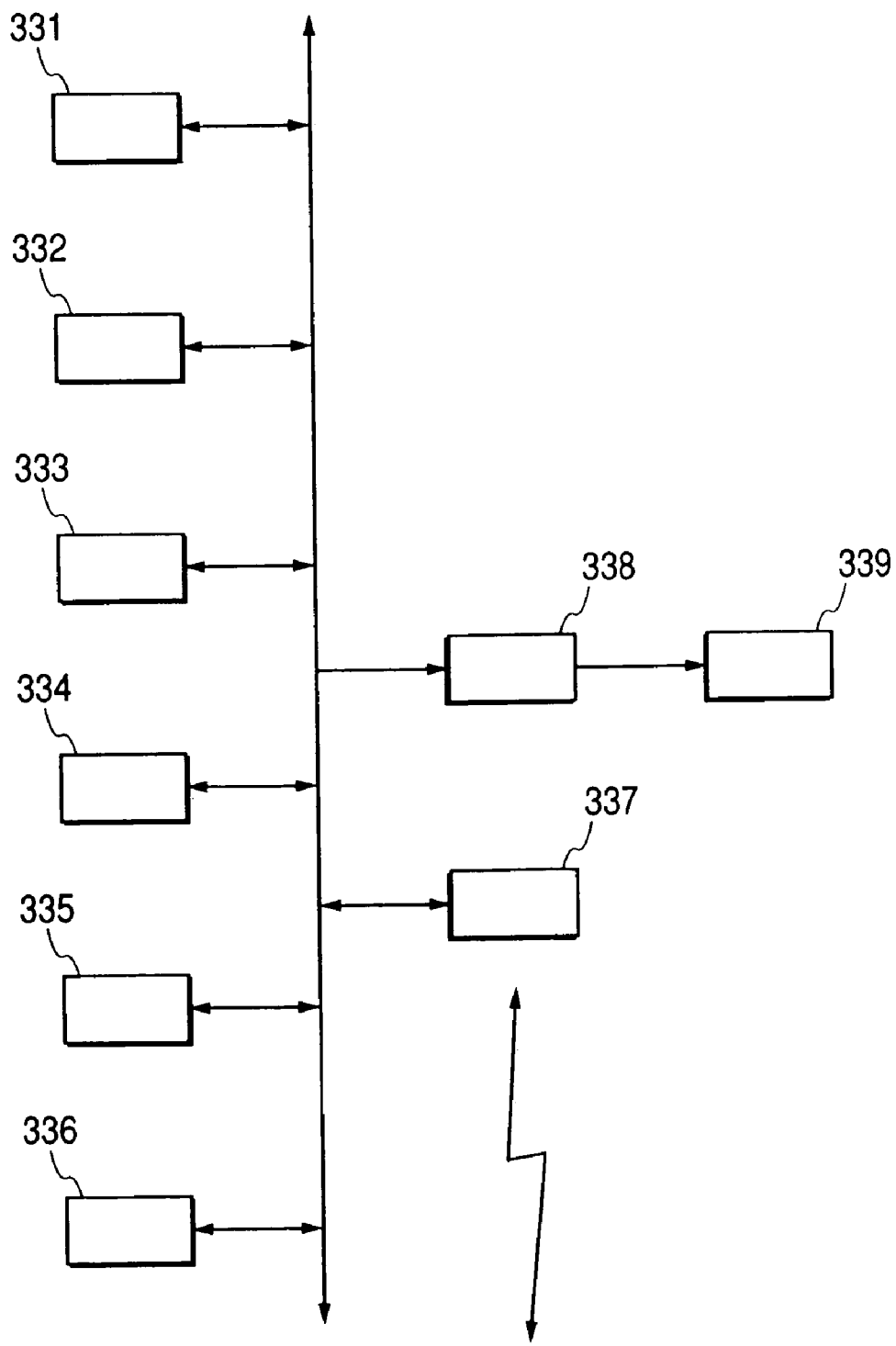
FIG. 32 is a configuration diagram of a personal computer.

FIG. 32 is a block diagram of the personal computer for use with the monitoring station, the managing station and the server. Reference numeral 331 denotes a CPU for controlling the whole system. Reference numeral 332 denotes a main storage unit (RAM). Reference numeral 333 denotes an external storage device for removably mounting a floppy disk or CD-ROM. Reference numeral 334 denotes a secondary storage device such as a hard disk for storing a program for effecting the software processing, as will be described later, under the control of the CPU 331. Reference numeral 335 denotes a mouse which acts as a pointing device. Reference numeral 336 denotes a keyboard. Reference numeral 337 denotes a network interface. Reference numeral 338 denotes a video board. Reference numeral 339 denotes a monitor.

Figure 33:
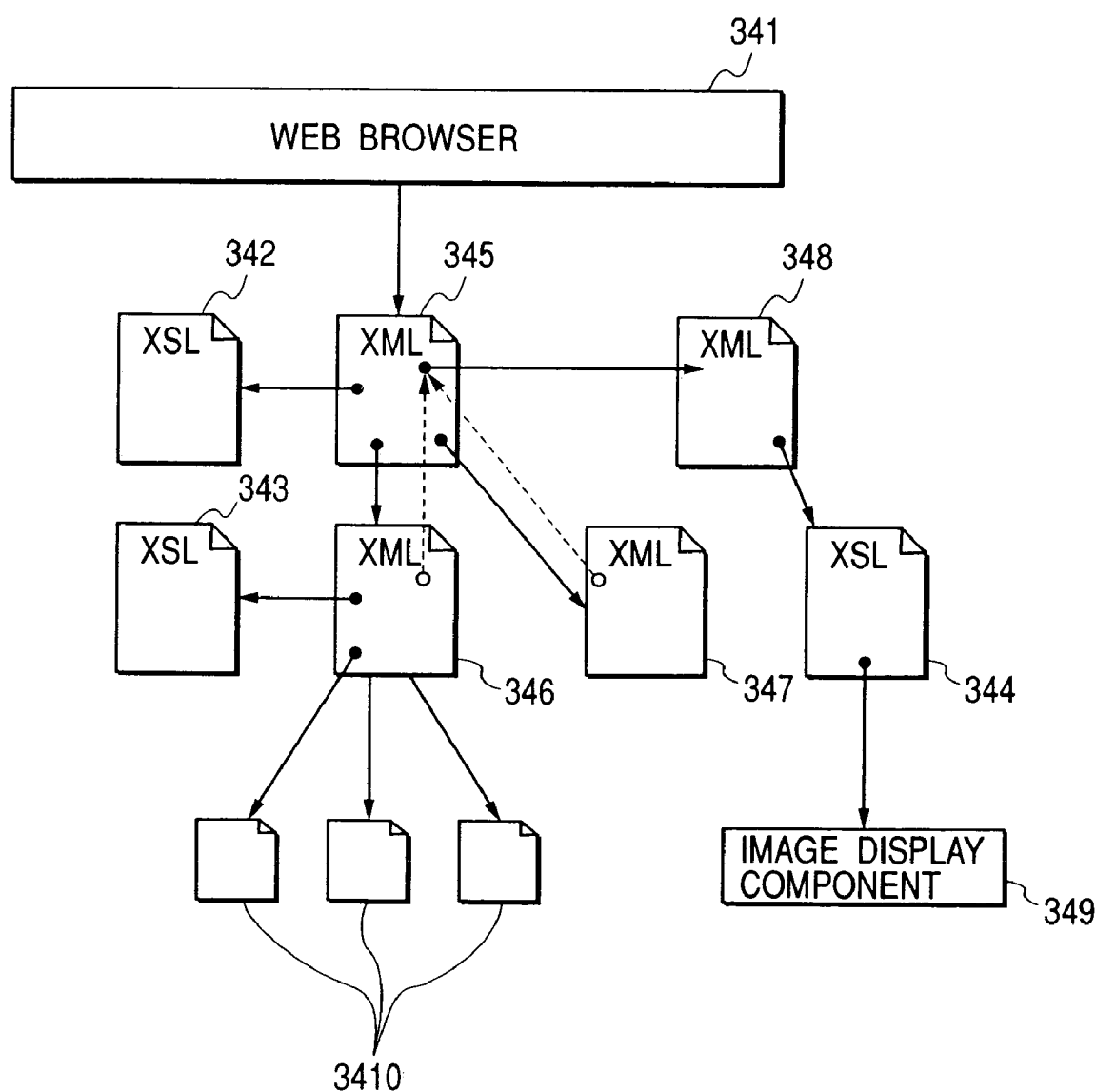
FIG. 33 is a configuration diagram of software and data in the monitoring station 304.

FIG. 33 is a block diagram of software and data to perform the processing under the control of the CPU 331 in the monitoring station 304. Reference numeral 341 denotes a Web browser for displaying a style sheet file described in a style designation language XSL applied to a data file described in a data description language XML. The Web browser 341 can execute a plug-in program in Java or Active form or a script program in ECMAScript (Java Script based Internet script language). Reference numeral 342 denotes a main style sheet file in which the display style and operation response of the overall monitoring screen are described. Reference numeral 343 denotes a map viewer style sheet file in which the display style and operation response of the map viewer 322 are described in XSL form and ECMAScript form. Reference numeral 344 denotes an image viewer style sheet file in which the display style and operation response of the image viewer 321 are described. Several kinds of style sheet files may be provided in accordance with the monitoring uses and the services.

Reference numeral 345 denotes a main data file in which the display option data of the overall monitoring screen is described. Reference numeral 346 denotes a map data file in which the camera layout data for the map viewer 322 is described. Reference numeral 347 denotes an image viewer data file in which the display option data of the image viewer is described. Reference numeral 348 denotes a camera list data file in which the management data of all the camera stations is described. Reference numeral 349 denotes an image display program component in Active X form or Java applet form. Reference numeral 3410 denotes an image data file of the bit map drawn on the camera map. The main data file 345 is linked with the main style sheet file 342 for style designation. Also, a link specification to use the map data file 346 as the map data and a link specification to use the camera list data file 348 as the camera list data are described.

The map data file 346 is linked with the map viewer style sheet file 343 for style designation. Reference to the data of the camera list data file 348 link with the main data file 345 is described. The camera list data file 348 has a link description with the image viewer style sheet file to be used for each camera. The image viewer style sheet file 44 has a link description of the image display program component 349 to be used.

Figure 34:
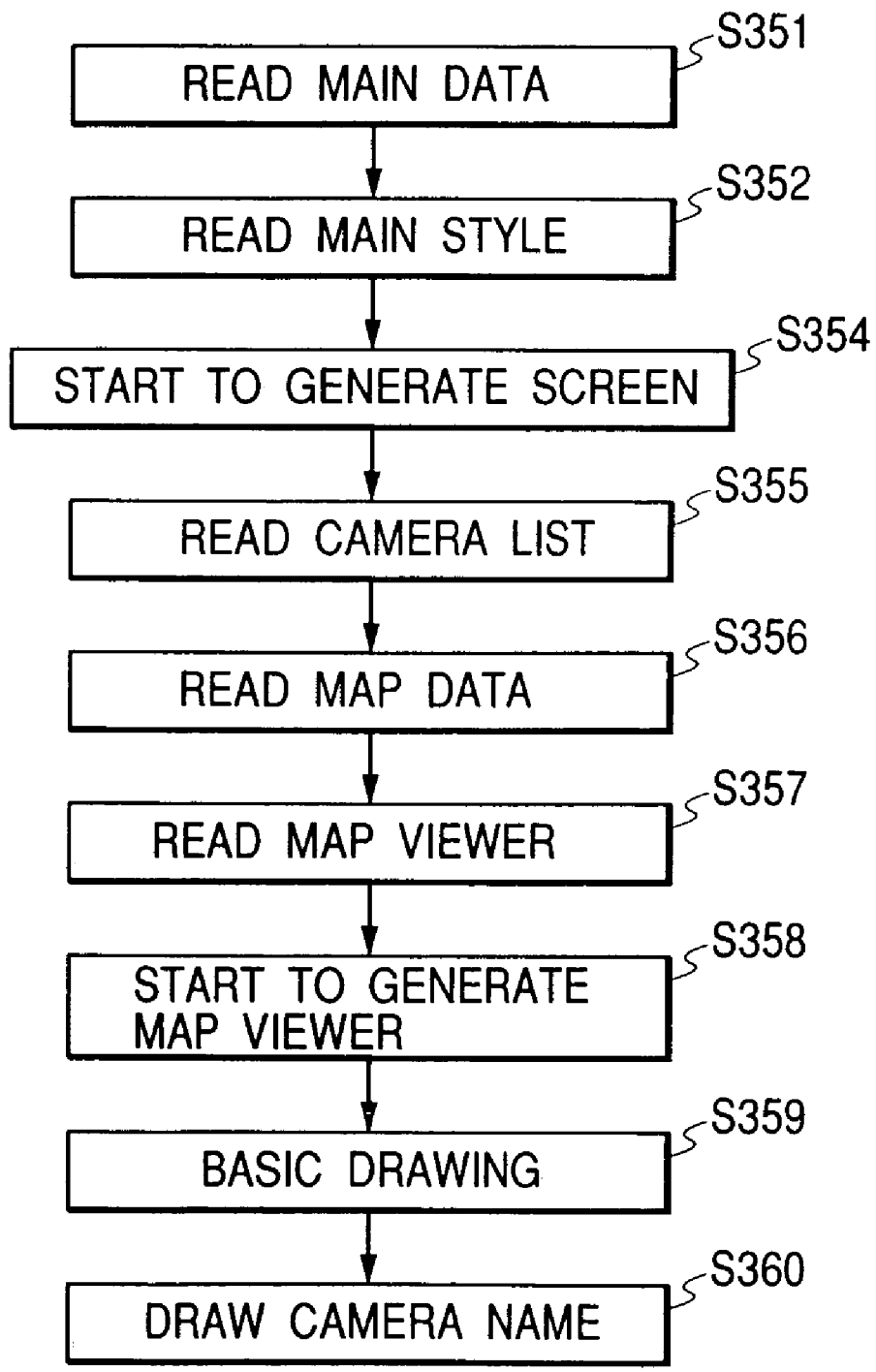
FIG. 34 is a flowchart showing the processing of a Web browser 341 generating a monitoring screen.

FIG. 34 is a flowchart showing a software process for the Web browser 341 in the monitoring station 304 to generate the monitoring screen under the control of the CPU 331. At first, the Web browser 341 reads the main data file 345 from the server 306 (step 351). Then, the main style sheet file 342 linked for style designation is read from the server 306 (step 352). Then, the main style sheet file 342 is analyzed, and the main data file 343 is analyzed in accordance with the translation specification described in XSL form to start to generate a monitoring screen (step 354). In this process, firstly, the camera list data file 348 link designated is read from the server 306 (step 355).

To display the map data file 346 linked as the camera map, the map data file 346 is read from the server 365 (step 356). Then, the map viewer style sheet file 343 which is linked for style with the map data file 346 is read from the server 306 (step 357). The map viewer style sheet file 343 is analyzed, and the map data file 346 is analyzed in accordance with the translation specification described in XST form to start to generate the map viewer screen (step 358).

Firstly, in this process, based on the link specification of the background bit map file described in the map data file 346 or the display position designation of camera icon, the bit map file 3410 is read from the server 306 to do the basic drawing of the map, as required (step 359). Then, the name of camera corresponding to the camera ID described in the map data file 346 is retrieved from the data of the camera list data file 348 referred to and displayed on the map (step 360).

Figure 35:
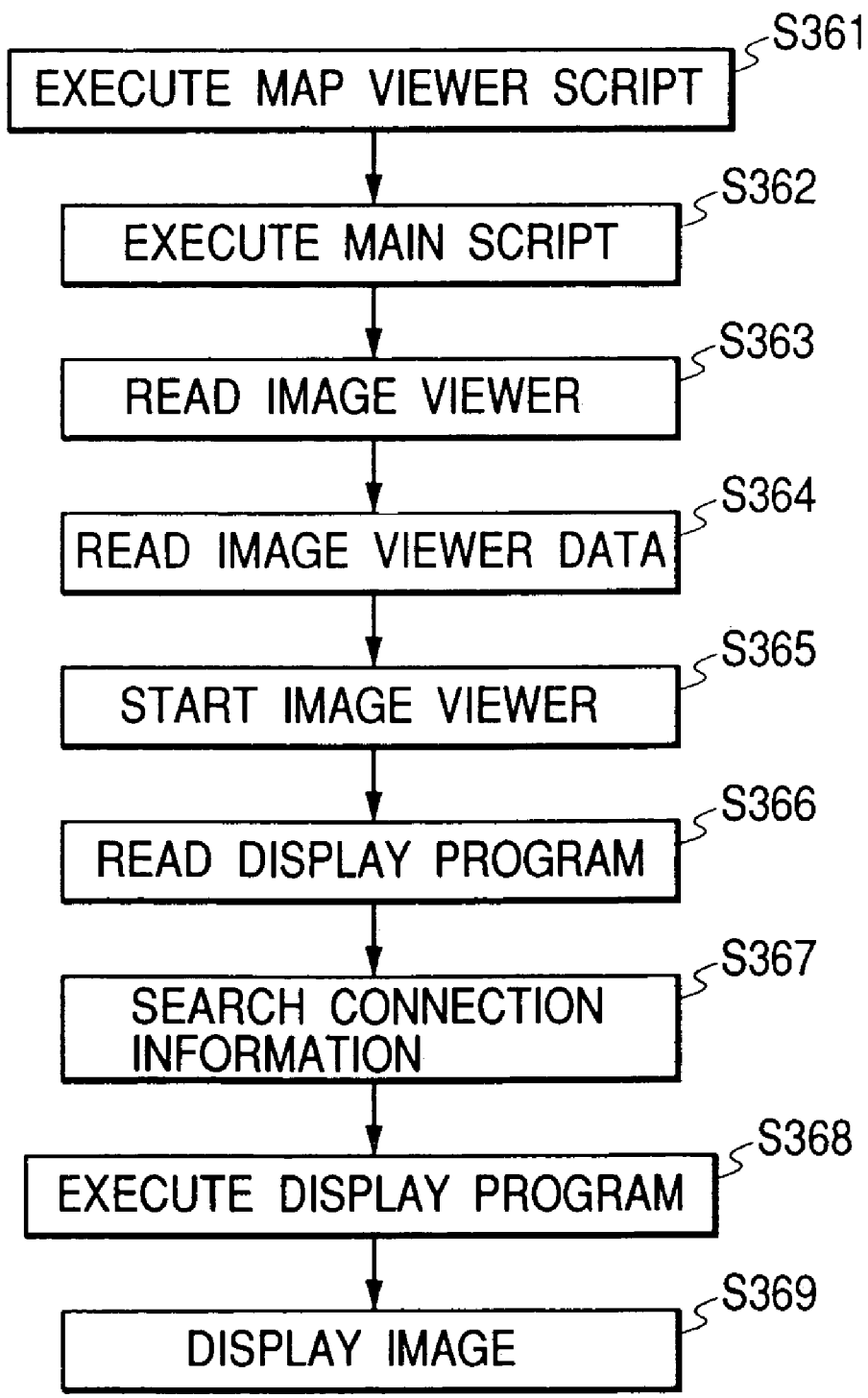
FIG. 35 is a flowchart showing the processing of the Web browser 341 generating an image viewer.

FIG. 35 is a flowchart showing the software processing for the Web browser 341 in the monitoring station 304 to generate an image viewer. If the operator of the monitoring station 304 clicks a camera icon on the map viewer using the pointing device 335, a script function described in the map viewer style sheet file 343 is executed (step 361). In this process, the script function described in the main style sheet file 342 is further executed (step 362).

Firstly, in this process, the link specification of the image viewer style sheet file 344 suitable for the camera corresponding to the camera ID of the camera icon clicked, is retrieved from the data of the camera list data file 348 and the image viewer style sheet file 344 is read from the server 346 (step 363). Then, the image viewer data file 347 is read from the server 306 (step 364). Then, the image viewer style sheet file 344 is analyzed, and the image viewer data file 347 is analyzed in accordance with the translation specification described in XST form to start to generate an image viewer screen (step 365).

Firstly, in this process, the image display program component 349 is read from the server 306 in accordance with the link specification described in the image viewer style sheet file 344 (step 366). Then, the connection information corresponding to the camera ID of the camera to be displayed is retrieved from the data of the camera list data file 348 (step 367). Then, the image display program component is executed by specifying the connection information retrieved (step 368). In this process, the image display program component is connected in TCP/IP to the camera station to acquire and display the image of camera (step 369).

As described above, by performing the software processing under the control of the CPU 331 in this example, the Web browser 341 generates and displays the monitoring screen at the initiation or dynamically in operation, based on various kinds of style sheet file or data file stored on the server 306. Therefore, only by exchanging the style sheet file, for example, the display style of the monitoring screen can be changed. Or only by changing the data file, the monitoring screen having the same display style can be generated for the different camera layout or configuration.

Figure 36:
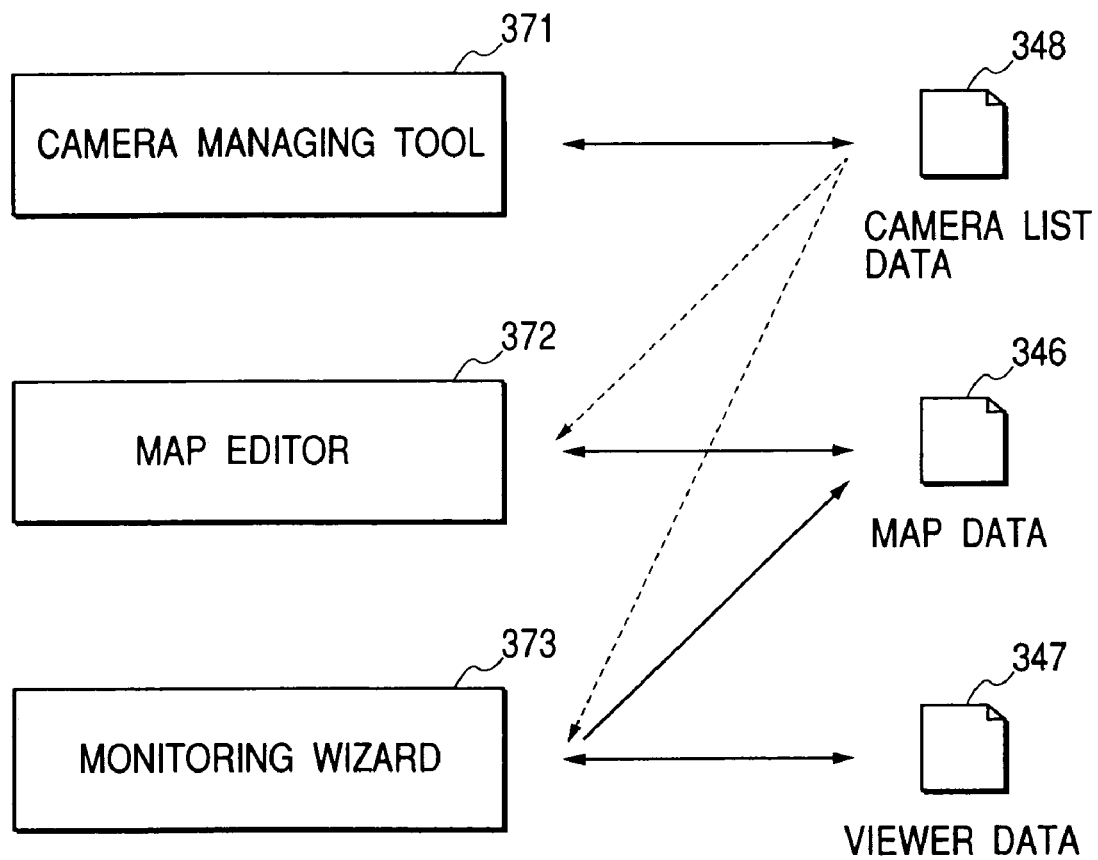
FIG. 36 is a configuration diagram of software and data in the managing station 305.

FIG. 36 is a block diagram of software and data of the managing station 305. The following processing is executed under the control of the CPU in the managing station. Reference numeral 371 denotes a camera managing tool for managing the information list such as the name, network address and type of the camera station connected to the network 303. The camera managing tool 371 writes the information onto the camera list data file 348 and saves it in the server 306. Reference numeral 372 denotes a map editor for editing the camera map. The map editor 372 edits the location of camera icon on the map and the background bit map, and writes that relevant information to the map data file 346 and saves it in the server 306. Reference numeral 373 denotes a monitoring wizard for automatically constructing the monitoring screen by presenting the questions in sequence. The monitoring wizard 373 writes a constructed result to the main data file 343 and the image viewer data file 347 and saves it in the server 306.

Figure 37:
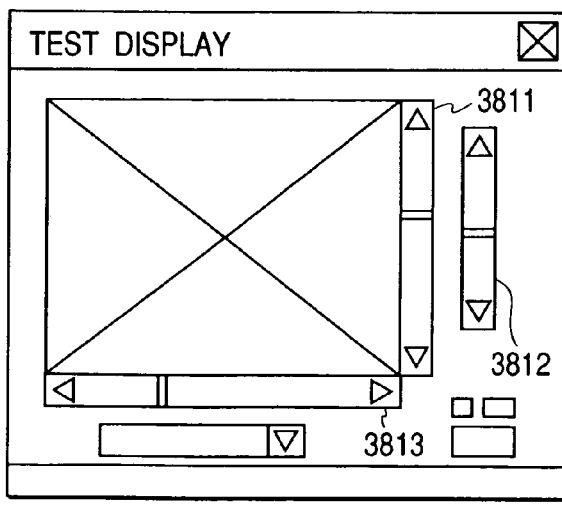
FIG. 37 is a view illustrating the screen of a camera managing tool 371.

FIG. 37 is a diagram showing a screen of the camera management tool 371 displayed at the managing station 305. Reference numeral 381 denotes a list display for displaying the registered information of camera station in the list. Reference numeral 382 denotes an add button for adding the new information of camera station. Reference numeral 383 denotes a name change name for changing the name of camera station. Reference numeral 384 denotes a delete button for deleting the registration of camera station. Reference numeral 385 denotes an automatic detection button for automatically detecting the camera station connected to the network in accordance with an automatic detecting protocol for network equipment such as Universal Plug and Play (UpnP).

When the automatic detection button 385 is depressed to detect the camera station automatically, the camera management tool 371 acquires the device information file in XML form from its camera station. And the link information to the image viewer style sheet file 344 to be used for its camera station, which is described in the device information file, is transcribed to the camera list data file 348. Reference numeral 388 denotes a property dialog for inputting the information of camera station. Reference numeral 386 denotes an address field for inputting the network address of camera station. Reference numeral 387 denotes a type combination box for designating the type of camera station.

Reference numeral 389 denotes a test button for displaying as the test the camera station. Reference numeral 3810 denotes a test display window. If the add button 382 is depressed, a property dialog 388 is opened to prompt the user to enter a network address of camera station (Internet protocol address) which is the connection information. Herein, if the address is falsely input, an error will occur when the monitoring screen created based on that information is executed. If the test button 389 is depressed, the test display window 3810 is opened, the connection to the camera station is tried, based on the input address. If there is no error of address, the connection to the camera station is effected so that the image of camera station is displayed. Since the property dialog 388 and the test display appear on the same monitor, it can be securely checked whether or not the image of camera station corresponds to the registered name of camera station to ensure promptly that the input is correct. Note that the slider bar 3811, 3812, or 3813 can be operated to instruct the camera station of the pan, tilt and zoom, and confirm the image of camera in a variety of camera conditions as a test image. A test display window 3810 may use an external program such as a Web browser.

The network address may be entered with a special wizard type window, instead of the property dialog 388. After the input of the address, the test display may be automatically made. As a result, it is possible to avoid forgetting the above-mentioned confirmation. Also, the test display continues until the operator makes a confirmation, or clicks the OK button 390 using the pointing device. Therefore, no confirmation is ended unsuitably. During the display of test image which is automatically performed, the pan, tilt and zoom is automatically instructed to the camera stations to be connected in sequence, so that the user can automatically obtain various test images for confirmation.

Figure 38:
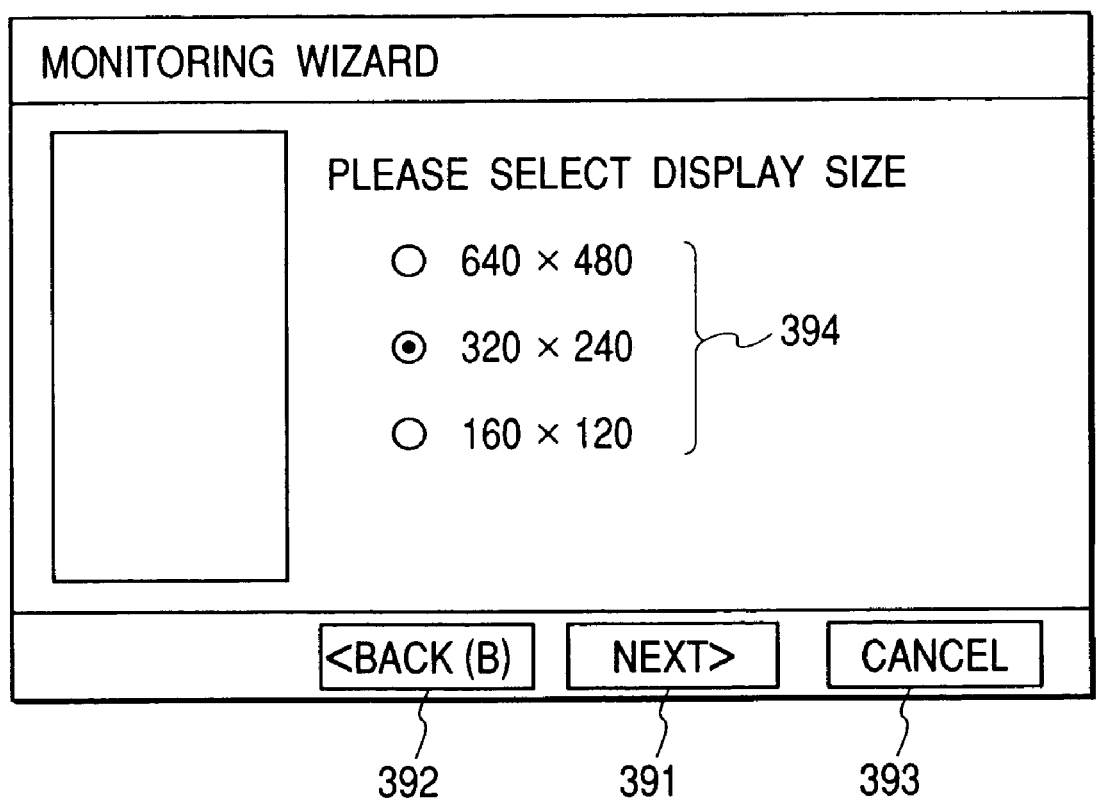
FIG. 38 is a view illustrating an inquiry screen of a monitoring wizard.

FIG. 38 is a view illustrating an example of an inquiry screen of a monitoring wizard. Reference numeral 391 denotes a "Next" button for going to the next question. Reference numeral 392 denotes a "Return" button for returning to the previous button. Reference numeral 393 denotes a "Cancel" button to cancel the monitoring wizard. Reference numeral 394 denotes an option button for selecting an answer for the question from among the choices.

Figure 39:
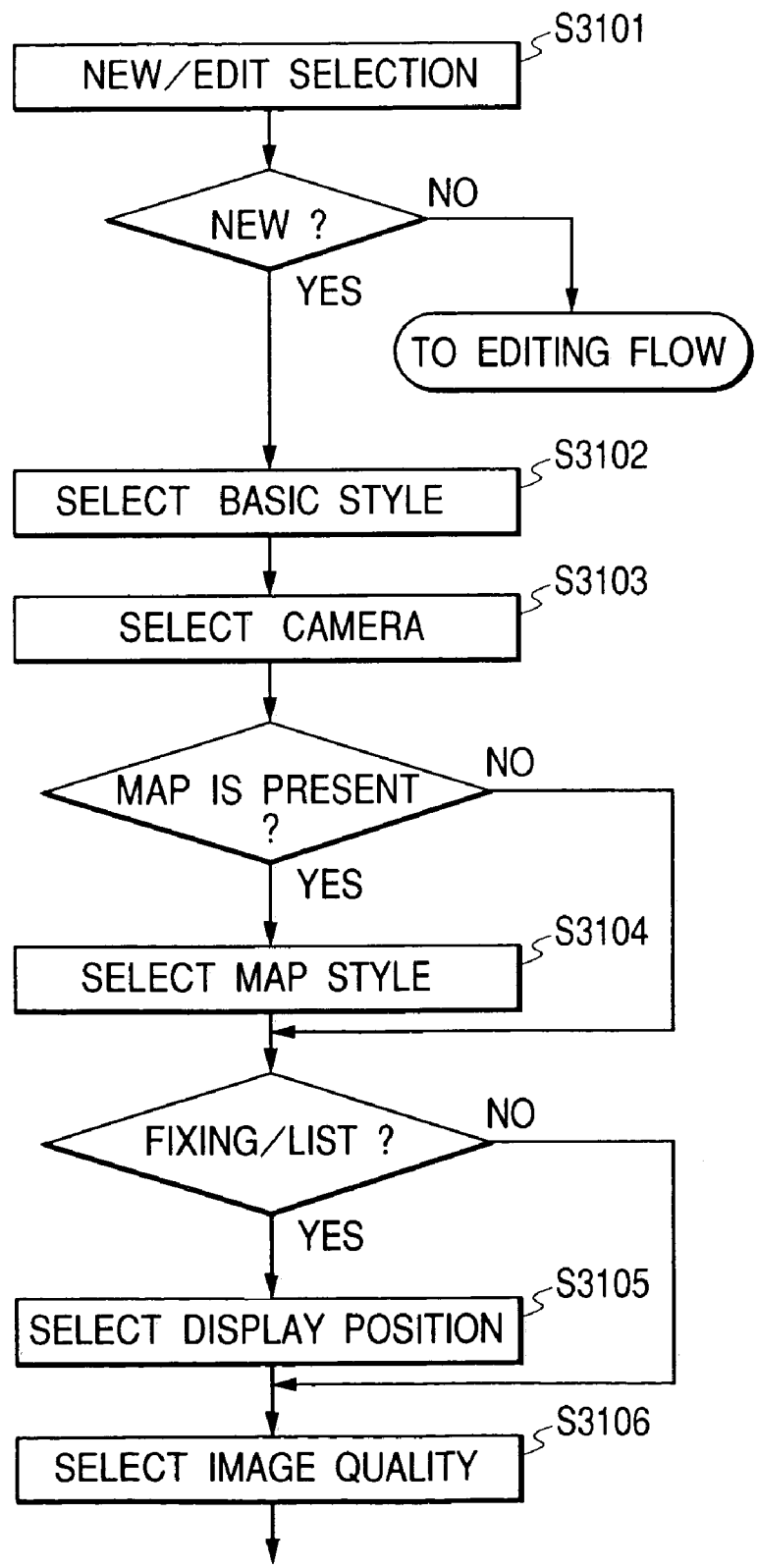
FIG. 39 is a flowchart illustrating the inquiry flow of the monitoring wizard.

FIG. 39 is a flowchart illustrating a question flow of the monitoring wizard. On a first screen, a question is made to specify the new creation of monitoring screen or the editing of existing screen (step S3101). In the case of the new creation, a question is made to select the basic style of the monitoring screen (step S3102). Then, a question is made to select a camera from among the cameras registered in the camera management tool (step S3103). Then, if the basic style uses the camera map, a question is made to select the display style of camera map (step S3104). This dialog is provided with a button for editing the camera map by starting the map editor. Then, when the basic style is a fixed display type, or a contents screen type, a question is made to select the display location of camera (step S3105). Lastly, a question is made to select the image quality of display image and the frame rate (step S3106).

If the above questions are asked and a completion button is depressed, the monitoring wizard 373 generates the main data file 343, the image viewer data file 347, and the map data file 346, as required, and saves them in the server 306. Then, the link to the main style sheet file 342 corresponding to the basic style selected in step S3102 is written into the main data file 343 as the style specification.

Figure 40:
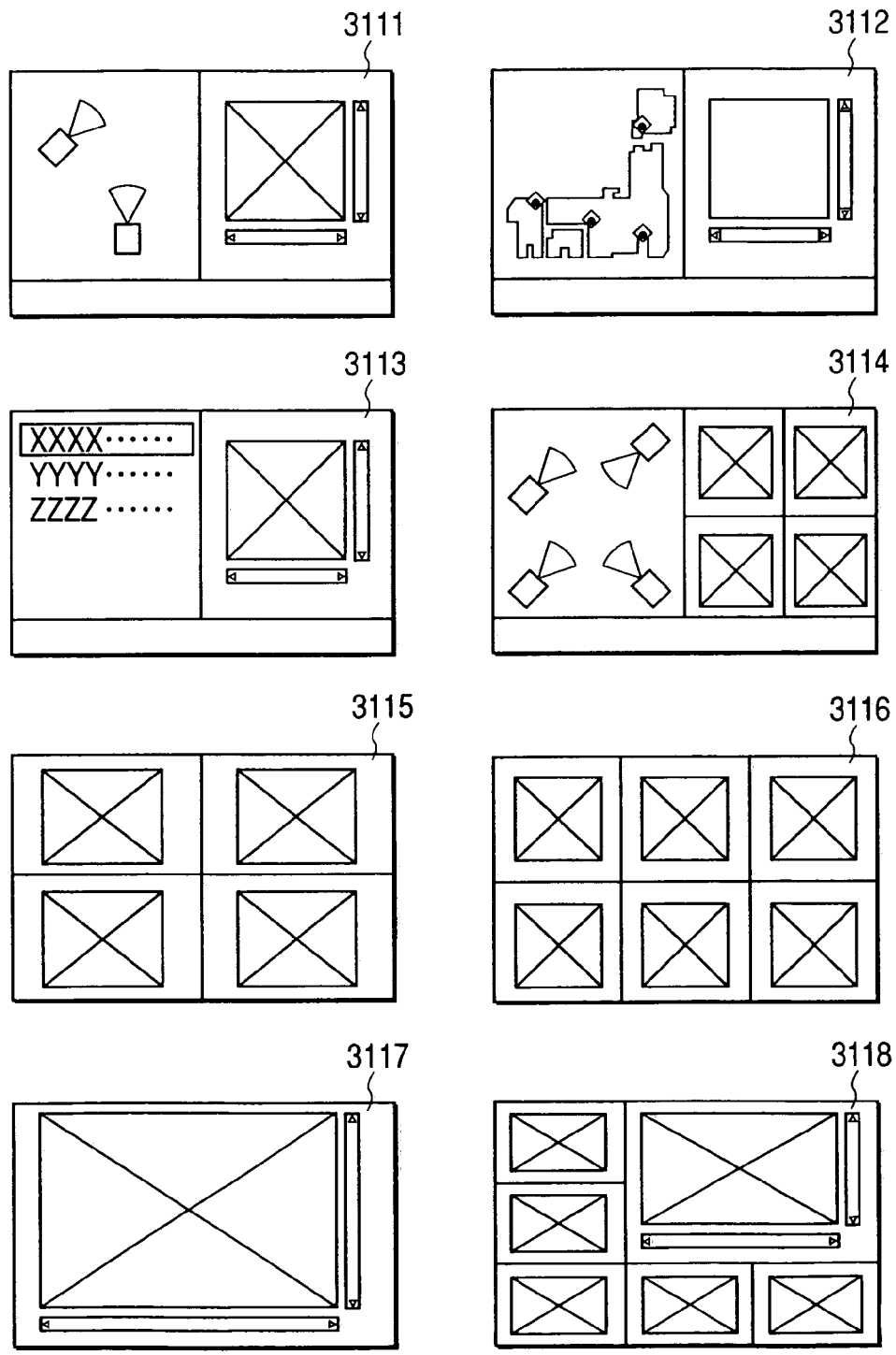
FIG. 40 is a view illustrating the choices of the basic style on the monitoring screen.

FIG. 40 is a view showing the choices of the basic style for the monitoring screen which is used at the monitoring station 304. Reference numeral 3111 denotes a style of floor type camera map plus image type, as shown in FIG. 31. Reference numeral 3112 denotes a style of wide area camera map plus image type. Reference numeral 3113 denotes a style of camera list plus image type. Reference numeral 3114 denotes a style of floor map plus four image fixed display type. Reference numeral 3115 denotes a style of four image fixed display type. Reference numeral 3116 denotes a style of six image fixed display type. Reference numeral 3117 denotes a style of one image full-screen type. Reference numeral 3118 denotes a style of contents screen plus image type.

OTHER EMBODIMENTS OF THE PRESENT INVENTION

A processing method of storing a program to operate the configuration of the above embodiment into a storage medium to implement the functions of the embodiment, reading the stored program from the storage medium as the code, and executing the program in the computer is contained within the range of the above embodiment, and the storage medium having the program stored is also contained within the same range.

Such storage medium may be a floppy disk, a hard disk, an optical disk, an optical magnetic disk, a CD-ROM, a magnetic tape, a non-volatile memory card, or a ROM.

Not only a single program stored in the storage medium to perform the processing, but also such a program operating on the OS in corporation with another software or the functions of the extension board to execute the operation of the above embodiments, are contained within the range of the above embodiments.

As described above, there are provided input means for inputting an identification name of camera connected to the network, and the connection information, receiving means for tentatively receiving the image data from the camera in accordance with the connection information, based on the connection information, and output means for outputting the identification name of the camera and the connection information to the display. It is possible to make confirmation for the image of camera and the identification name of camera and ensure that the camera is correctly connected to the network.

Since the receiving means involves a tentative reception automatically, after the input means has accepted the identification name and the connection information, the confirmation may be automatically effected. Further, since the output to the display is not ended without confirmation of the operator, it is possible to prevent the confirmation from ending unsuitably without instruction of the operator.

In making the automatic reception, at least one of the pan, tilt and zoom conditions is automatically instructed to the camera in accordance with the connection information, the image of the camera in the stated conditions can be received, and any of the pan, tilt and zoom of the camera can be changed in response to an instruction on the display in receiving the image data tentatively. Since the image data being received tentatively is varied, it is possible to confirm various test images which can be acquired from the camera.

What is claimed is:

1. An image processing apparatus, comprising:
    a generating device that generates a map having a symbol indicating an installed position of a camera;
    a control device that controls a first mode that image of the camera corresponding to the symbol is monitored, and a second mode that the information regarding the camera, including the position of camera, is associated with the map;
    a receiving device that receives the image data corresponding to an image picked up by the camera in the first mode and the second mode; and
    an output device that outputs the received image data onto a first area of a display in the first mode, and outputs the received image data onto a second area of the display in the second mode.

2. The image processing apparatus according to claim 1, wherein said information regarding the camera includes the information of the direction of camera.

3. The image processing apparatus according to claim 1, wherein the position of the symbol corresponding to the camera on the map is determined in accordance with said information regarding the camera.

4. The image processing apparatus according to claim 2, wherein the direction of the symbol corresponding to the camera on the map is determined in accordance with the information regarding the camera.

5. The image processing apparatus according to claim 1, further comprising a control device that controls a camera corresponding to the symbol in response to an operation on the symbol.

6. The image processing apparatus according to claim 1, wherein the data input for association is performed by a manual instruction of the operator.

7. The image processing apparatus according to claim 6, further comprising a display device that displays the image data, the data input being performed on the display device.

8. An image processing method, comprising the steps of:
    generating a map having a symbol indicating an installed position of a camera;
    controlling a first mode that image of the camera corresponding to the symbol is monitored, and a second mode that the information regarding the camera, including the position of the camera, is associated with the map;
    receiving image data corresponding to an image picked up by the camera in the first mode and the second mode; and
    outputting the received image data onto a first area of a display in the first mode, and outputting the received image data onto a second area of the display in the second mode.

9. A storage medium readable by a computer, wherein the storage medium stores:
    a code for generating a map having a symbol indicating an installed position of a camera;
    a code for controlling a first mode that image of the camera corresponding to the symbol is monitored, and second mode that the information regarding the camera, including the position of the camera, is associated with the map;

a code for receiving the image data corresponding to an image picked up by the camera in the first mode and the second mode; and a code for outputting the received image data onto a first area of a display in the first mode, and outputs the received image data onto a second area of the display in the second mode.

10. An image processing apparatus, comprising:

an input device that inputs connection information in accordance with a user's input;

a receiving device that receives normal image data in accordance with a symbol of a camera on a display and tentative image data from the camera in accordance with the connection information; and an output device that outputs the connection information onto a display, wherein said output device outputs the received image data onto a first area of the display when the camera is connected by user's selecting the symbol of the camera and outputs the received tentative image data on a second area of the display when the camera is connected not by the user's selecting the symbol of the camera but connected by user's inputting the connection information.

11. The image processing apparatus according to claim 10, wherein the connection information of the camera includes an Internet protocol address of the camera.

12. The image processing apparatus according to claim 10, wherein said receiving device performs the tentative reception automatically after the input device accepts the input.

13. The image processing apparatus according to claim 10, wherein the output to the display is not ended without confirming instruction of an operator.

14. The image processing apparatus according to claim 12, wherein at least one instruction of the pan, tile and zoom conditions is automatically output to a camera in accordance with the connection information, in performing the automatic reception, to receive an image of the camera in stated conditions.

15. The image processing apparatus according to claim 10, wherein at least one of the pan, tile and zoom of the camera is changeable in accordance with an instruction on the display, in performing the tentative reception of the image data, the image data received tentatively being variable.

16. An image processing method, comprising the steps of:

inputting connection information in accordance with a user's input;

receiving normal image data in accordance with a symbol of a camera on a display and tentative image data from the camera in accordance with the connection information; and outputting the connection information onto a display, wherein said output step includes a step of outputting the received image data onto a first area of the display when the camera is connected by user's selecting the symbol of the camera, and outputting the received tentative image data on a second area of the display when the camera is connected not by user's selecting the symbol of the camera but by user's inputting the connection information.

17. A computer readable storage medium that stores:

a code for inputting connection information in accordance with a user's input;

a code for receiving normal image data in accordance with a symbol of the a camera on a display and tentative image data from the camera in accordance with the connection information; and a code for outputting the connection information onto a display, wherein said code for outputting includes a code for outputting the received image data onto a first area of the display when the camera is connected by user's selecting the symbol of the camera, and outputting the received tentative image data on a second area of the display when the camera is connected not by user's selecting the symbol of the camera but connected by user's inputting the connection information.

18. An image processing apparatus comprising:

a generating device that generates a map having a symbol indicating an installed position of a camera;

a receiving device that receives the image data corresponding to an image picked up by the camera; and an output device that outputs the received image data onto a first area of a display when the camera is connected by user's selecting the symbol of the camera, and outputs the received image data on a second area of the display when the camera is connected not by user's selecting the symbol of the camera but connected by user's inputting the connection information.

19. The image processing apparatus according to claim 18, wherein the other area is one dialog panel.

20. The image processing apparatus according to claim 18, wherein the user's setting operation is an operation to add a new symbol to the map.

21. The image processing apparatus according to claim 18, further comprises designating devise that designates start and stop of outputting the received image data onto the other area.

22. An image processing method, comprising the steps of:

generating a map having a symbol indicating an installed position of a camera;

receiving the image data corresponding to an image picked up by the camera; and outputting the received image data onto a first area of a display and area of the when the camera is connected by user's selecting the symbol of the camera, and outputting the received image data on a second area of the display when the camera is connected not by user's selecting the symbol of the camera but connected by user's inputting the connection information.

23. A storage medium readable by a computer, wherein the storage medium stores:

a code for generating a map having a symbol indicating an installed position of a camera;

a code for receiving the image data corresponding to an image picked up by the camera; and a code for outputting the received image data onto a first area of a display when the camera is connected by user's selecting the symbol of the camera, and outputting the received image data on a second area of the display when the camera is connected not by user's selecting the symbol of the camera but connected by user's inputting the connection information.

\* \* \* \* \*